(12) United States Patent
Teraguchi et al.

(10) Patent No.: US 11,214,181 B2
(45) Date of Patent: Jan. 4, 2022

(54) SEAT RECLINING DEVICE FOR VEHICLE

(71) Applicant: TOYOTA BOSHOKU KABUSHIKI KAISHA, Aichi (JP)

(72) Inventors: Hiroaki Teraguchi, Aichi-ken (JP); Yoichi Takada, Aichi-ken (JP)

(73) Assignee: TOYOTA BOSHOKU KABUSHIKI KAISHA, Aichi (JP)

( * ) Notice: Subject to any disclaimer, the term of this patent is extended or adjusted under 35 U.S.C. 154(b) by 0 days.

(21) Appl. No.: 16/971,964

(22) PCT Filed: Feb. 26, 2019

(86) PCT No.: PCT/JP2019/007391
§ 371 (c)(1),
(2) Date: Aug. 21, 2020

(87) PCT Pub. No.: WO2019/164018
PCT Pub. Date: Aug. 29, 2018

(65) Prior Publication Data
US 2020/0391623 A1    Dec. 17, 2020

(30) Foreign Application Priority Data

Feb. 26, 2018 (JP) .............................. JP2018-031933

(51) Int. Cl.
*B60N 2/22* (2006.01)
*B60N 2/235* (2006.01)

(52) U.S. Cl.
CPC .................................. *B60N 2/224* (2013.01)

(58) Field of Classification Search
CPC .. B60N 2/236; B60N 2/2356; B60N 2205/20; A47C 1/026
(Continued)

(56) References Cited

U.S. PATENT DOCUMENTS

| 6,715,835 B2 * | 4/2004 | Hoshihara | B60N 2/236 297/366 |
| 2002/0171280 A1 * | 11/2002 | Okazaki | B60N 2/236 297/367 R |

(Continued)

FOREIGN PATENT DOCUMENTS

| JP | 2003-000379 | 1/2003 |
| JP | 2009-201783 | 9/2009 |

(Continued)

OTHER PUBLICATIONS

International Search Report in International Patent Application No. PCT/JP2019/007391, dated May 21, 2019, and English-translation thereof.

(Continued)

*Primary Examiner* — Sarah B McPartlin
(74) *Attorney, Agent, or Firm* — Greenblum & Bernstein, P.L.C.

(57) ABSTRACT

A seat reclining device for a vehicle is configured such that an operating surface section and a projection of a pole are disposed at locations separate from each other along the radial direction of a body surface section, and are half-punched from the body surface section in one direction along the axial direction so as to form projections. A pressed surface section of the pole is provided on an edge surface of the body surface section formed on the other side in the axial direction of the operating surface section along with the half-punched projection of the operating surface section.

7 Claims, 20 Drawing Sheets

(58) Field of Classification Search
USPC .................................................. 297/366, 367
See application file for complete search history.

(56) References Cited

U.S. PATENT DOCUMENTS

| | | | |
|---|---|---|---|
| 2006/0202537 A1* | 9/2006 | Smuk | B60N 2/236 297/366 |
| 2009/0218870 A1 | 9/2009 | Kawamura et al. | |
| 2014/0284983 A1* | 9/2014 | Yamada | B60N 2/2356 297/362 |
| 2017/0334321 A1 | 11/2017 | Suzuki et al. | |
| 2018/0009340 A1 | 1/2018 | Nagura et al. | |

FOREIGN PATENT DOCUMENTS

| | | |
|---|---|---|
| JP | 2017-210022 | 11/2017 |
| WO | WO2016/0129423 | 8/2016 |

OTHER PUBLICATIONS

Written Opinion in International Application No. PCT/JP2019/007391, dated May 21, 2019.
Office Action dated Oct. 5, 2021 in corresponding Japanese patent application No. 2018-031933 and its English translation.

* cited by examiner

SEAT RECLINING DEVICE FOR VEHICLE

TECHNICAL FIELD

The present invention relates to a vehicle seat reclining device. More specifically, the present invention relates to a vehicle seat reclining device for adjusting a tilt angle of a seat back.

BACKGROUND ART

As a vehicle seat reclining device of related art, there is known a device including a stepped lock mechanism capable of adjusting a backrest angle of a seat back at a constant pitch angle (Patent Literature 1). The vehicle seat reclining device described above is configured as a joint device that connects the seat back to a seat cushion in a state where the backrest angle can be adjusted. Specifically, the vehicle seat reclining device described above includes a ratchet and a guide which are made of substantially disc-shaped metal members and which are assembled so as to be rotatable relative to each other, and a lock mechanism that locks the relative rotation thereof.

The lock mechanism described above is configured to lock relative rotation between the ratchet and the guide by pressing a plurality of poles set in the guide against inner peripheral teeth formed on an outer peripheral portion of the ratchet by biasing and meshing with each other. Specifically, in a rotation region of the ratchet with respect to the guide, the ratchet described above is set with a lock region where the meshing of each pole is allowed, and a free region where each pole can ride to be prevented from meshing. Further, each pole described above is formed with a pressed surface portion to be pressed from the inner side in the radial direction by a cam set in a central portion of the guide, a riding protrusion which is a riding portion to the free region described above, and a pull-in operation surface portion that is operated to be pulled inward in the radial direction by the cam described above. The pressed surface portion, the riding protrusion, and the pull-in operation surface portion are formed by half blanking on each pole.

CITATION LIST

Patent Literature

Patent Literature 1: WO 2016/129423

SUMMARY OF INVENTION

Technical Problem

In related art described above, since the pressed surface portion, the riding protrusion, and the pull-in operation surface portion of each pole are formed collectively so as to appear unevenly on front and back surfaces in the axial direction by a process of half blanking each pole with a connecting line, it is difficult to increase the processing accuracy on both the front and back surfaces at the same time. One of the objects of the present invention is to improve the processing accuracy on both front and back surfaces of a pole in a vehicle seat reclining device.

Solution to Problem

[1] According to a first aspect of the present invention, a vehicle seat reclining device includes:

a disc-shaped ratchet and a disc-shaped guide, the ratchet and the guide being coaxially assembled in a relatively rotatable manner:

a lock mechanism provided between the ratchet and the guide, and capable of restricting relative rotation between the ratchet and the guide; and a retaining ring retaining an assembled state of the ratchet and the guide, and the lock mechanism includes: a pole supported by the guide movably in a radial direction, the pole meshing with the ratchet when moving outward in the radial direction so as to restrict the relative rotation between the ratchet and the guide; and a cam for moving the pole outward or inward in the radial direction, the pole has a main body surface portion having outer peripheral teeth configured to mesh with the ratchet; a pressed surface portion configured to receive a force directed outward in the radial direction from the cam: an operation surface portion configured to receive a force directed inward in the radial direction from the cam; and a protrusion that interferes with a predetermined portion of the ratchet so as to prevent the outer peripheral teeth from meshing with the ratchet when the ratchet is in a specific rotation position with respect to the guide, the operation surface portion and the protrusion are arranged at positions separated away from each other in the radial direction, and have a shape protruding from the main body surface portion to one side in an axial direction in a half-blanking shape, and the pressed surface portion is provided on an end surface of the main body surface portion, the end surface of the main body surface portion being formed on the other side in the axial direction of the operation surface portion in accordance with the half-blanking shaped protrusion of the operation surface portion.

According to the first aspect, the operation surface portion and the protrusion of the pole are formed at positions separated from each other so as to protrude from the main body surface portion in a half-blanking shape, so that the processing accuracy of each of the operation surface portion and the protrusion can be set independently of each other. For example, at least a part of a surface of the protrusion that interferes with the predetermined portion (free region described later) of the ratchet can be set as a quality control surface (that is, a surface that actively manages so that the processing accuracy is within a target range), and further, at least a part of the pressed surface portion that receives a force directed outward in the radial direction from the cam can be set as a quality control surface.

[2] According to a second aspect of the present invention, in the first aspect described above, the protrusion has an inclined surface that comes into contact with the predetermined portion in a peripheral direction when the ratchet rotates toward the specific rotation position.

According to the second aspect, when the protrusion comes into contact with the predetermined portion (free region described later) of the ratchet as the ratchet rotates, the protrusion moves so as to escape from the predetermined portion while sliding the inclined surface with respect to the predetermined portion. Therefore, the rotation of the ratchet is not excessively obstructed by the protrusion, and the rotation of the ratchet is facilitated. Further, the processing accuracy of the inclined surface is appropriately increased, so that the effects described above can be more appropriately exhibited.

DESCRIPTION OF EMBODIMENTS

Figure 1:
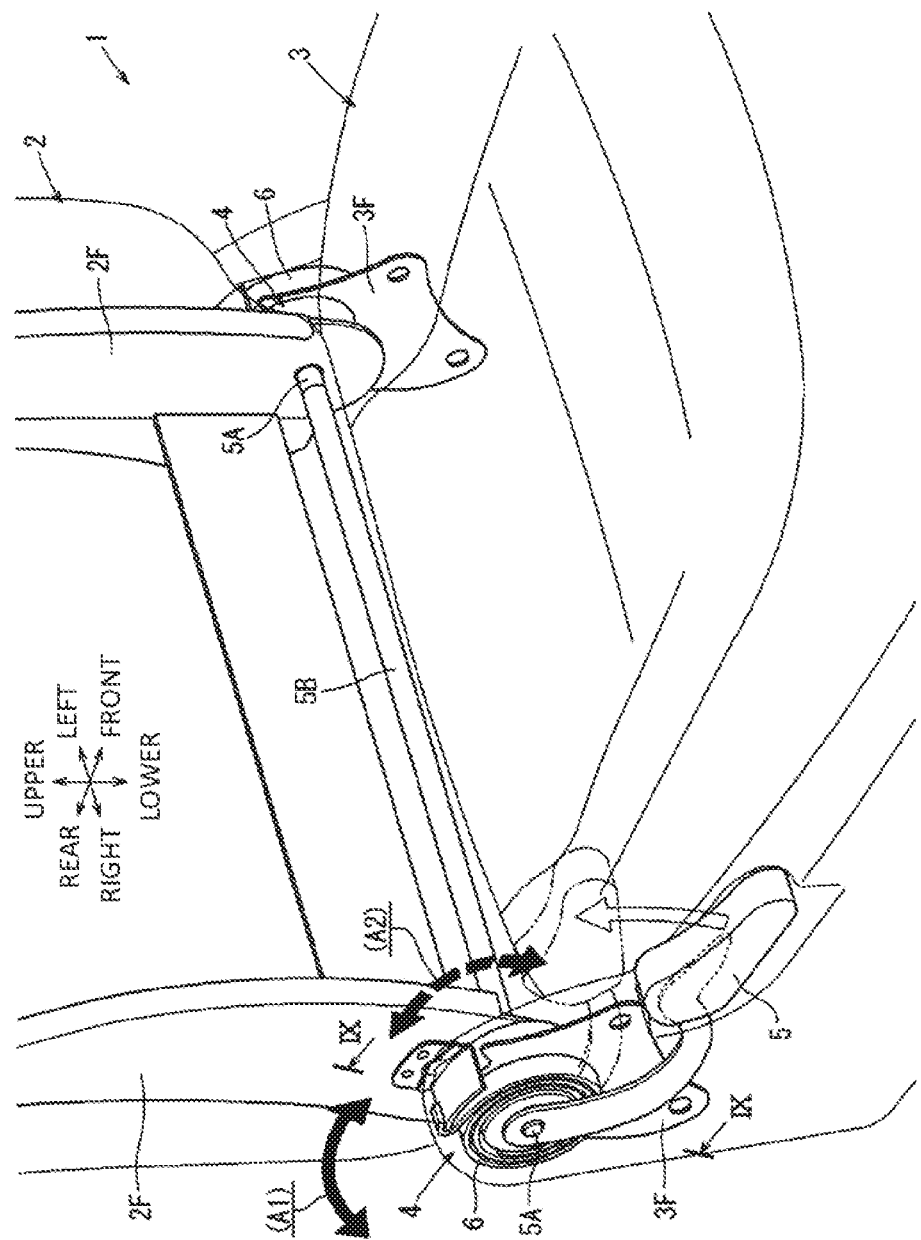
FIG. 1 is a perspective view showing a schematic configuration of a vehicle seat to which a vehicle seat reclining device according to a first embodiment is applied.

Hereinafter, an embodiment for carrying out the present invention are described with reference to drawings.

First Embodiment (Schematic Configuration of Seat Reclining Device 4)

First, the configuration of a vehicle seat reclining device 4 (hereinafter, simply referred to as "device 4") according to the first embodiment will be described with reference to FIGS. 1 to 20. In the following description, directions such as front, rear, upper, lower, left, and right refer to respective directions shown in the drawings. Further, a "seat width direction" refers to a left-right direction of a seat 1.

As shown in FIG. 1, the device 4 according to the present embodiment is applied to the seat 1 that constitutes a right side seat of an automobile. The device 4 described above is configured as a seat reclining adjustment mechanism that connects a seat back 2 that serves as a backrest portion of the seat 1 described above to a seat cushion 3 that serves as a seating portion in a state in which an backrest angle can be adjusted. Specifically, the device 4 described above is provided between the seat back 2 and the seat cushion 3 described above such that a pair of left and right devices 4 are provided. The device 4 is configured to fix or release the backrest angle of the seat back 2 by being switched integrally between a locked state and an unlocked state.

Figure 2:
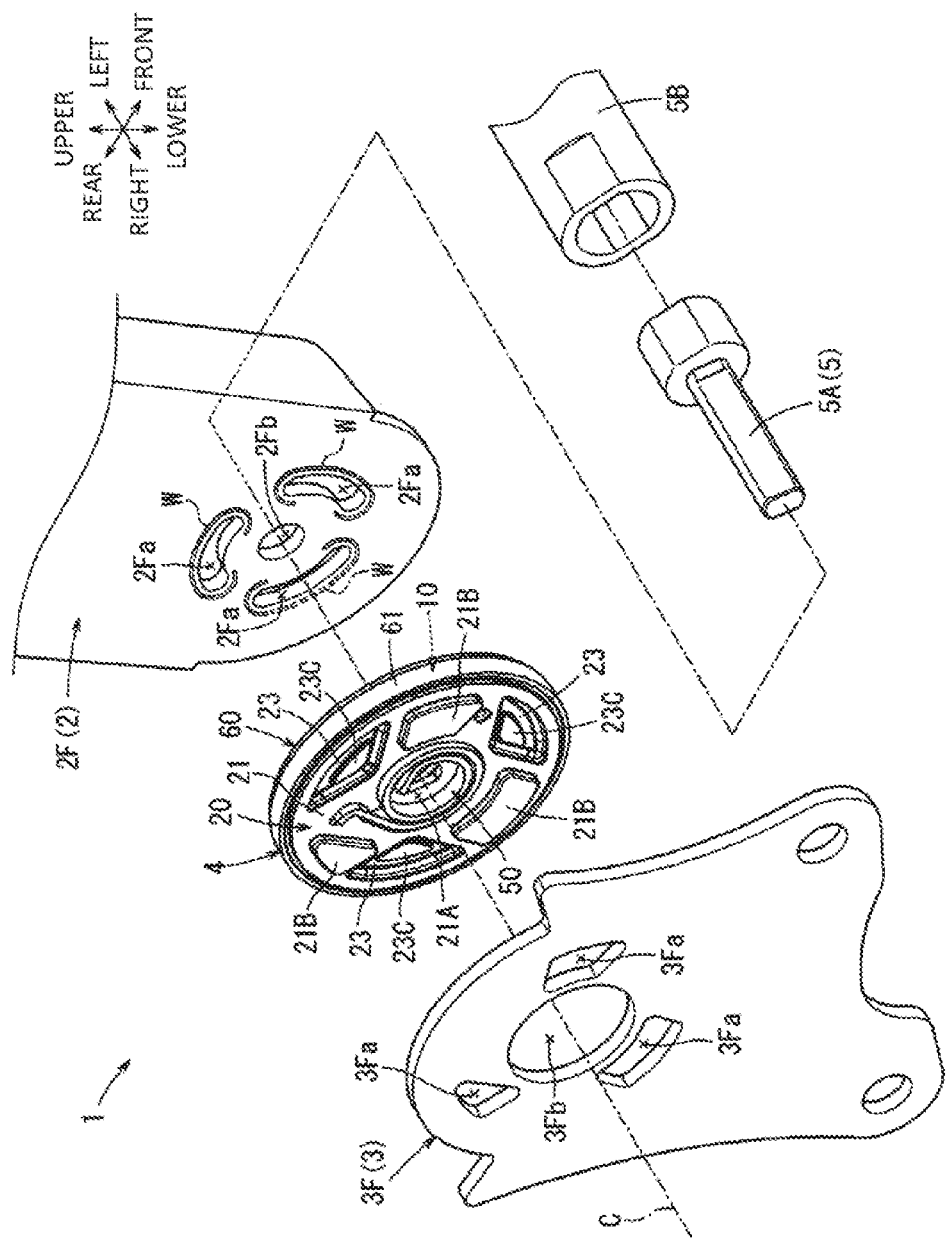
FIG. 2 is an exploded perspective view of a main part of FIG. 1.
Figure 3:
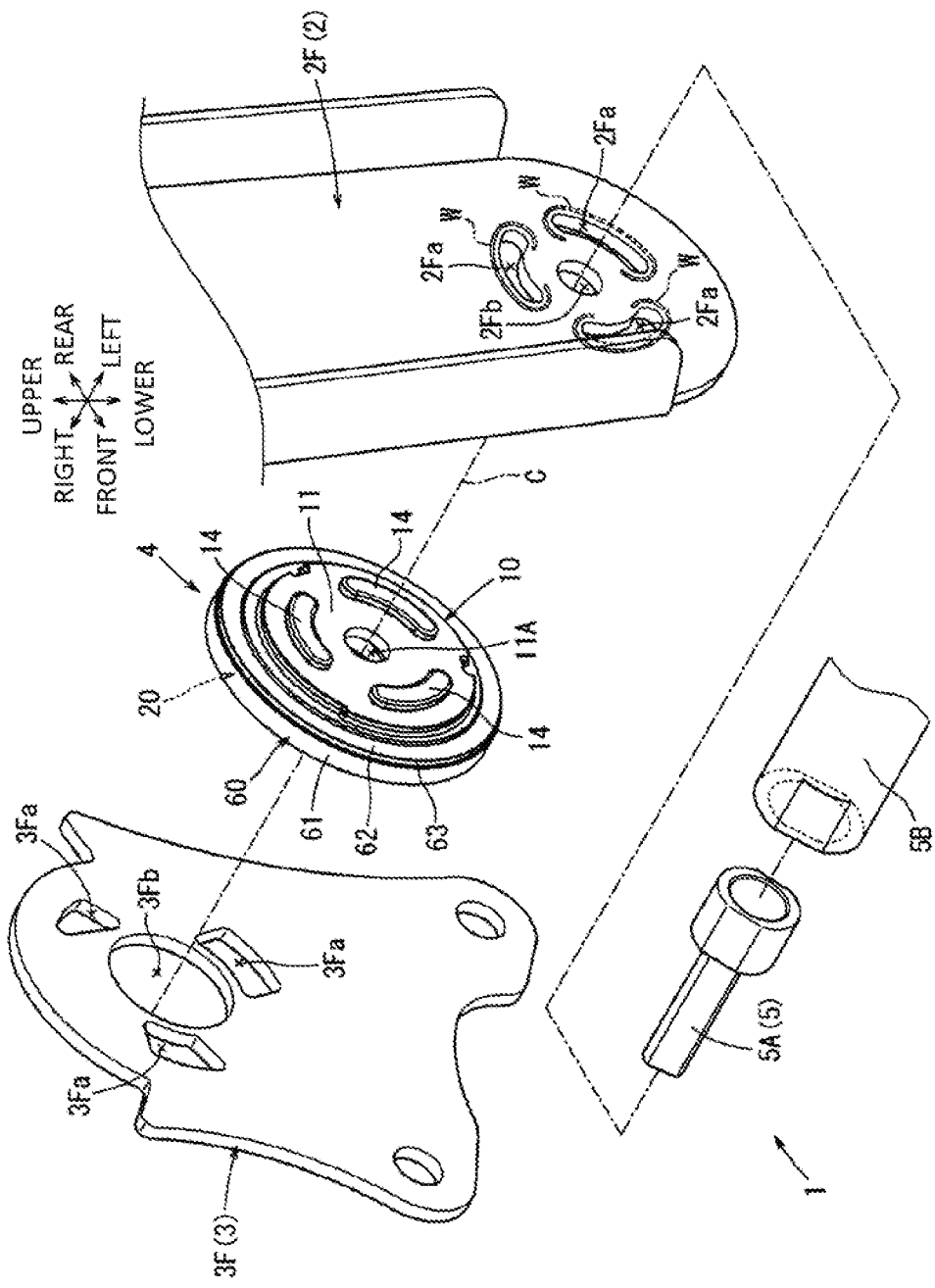
FIG. 3 is an exploded perspective view of FIG. 2 viewed from an opposite side.

Specifically, the devices 4 described above are provided between respective lower end portions of side frames 2F forming left and right side frames of the seat back 2 described above and respective reclining plates 3F connected to rear end portions of left and right side frames of the seat cushion 3 located on an outer side in the seat width direction, so that the devices 4 can be relatively rotated or stopped relative to each other coaxially (see FIGS. 2 and 3).

The devices 4 described above are usually held in a locked state in which the backrest angle of the seat back 2 is fixed. The devices 4 are released from the locked state all at once by an operation of pulling up a reclining lever 5 provided on a right side portion of the seat cushion 3 which is on a vehicle outer side so as to be switched to an unlocked state in which the backrest angle of the seat back 2 can be changed. The devices 4 are returned to the locked state again by being biased after the operation of pulling up the reclining lever 5 described above is returned.

Here, return springs 6 that always apply a spring biasing force to the seat back 2 in a direction in which the seat back 2 rotates to tilt forward are hooked between the side frames 2F on the left and right sides of the seat back 2 and the reclining plates 3F arranged on the outer side thereof. Due to the rotational biasing force of these return springs 6, the seat back 2 is lifted up to a position where the seat back 2 comes into contact with the back of a seated occupant by releasing the fixed state of the backrest angle by the device 4 described above, such that the backrest angle can be freely adjusted back and forth in accordance with the movement of tilting back and forth by the back of the seated occupant. According to such a configuration, the seat back 2 is configured such that the backrest angle can be easily adjusted.

The seat back 2 can rotate in a seat front-rear direction in a rotation region of about 180 degrees with respect to the seat cushion 3 described above between a forward tilting position where the seat back 2 is folded up to an upper surface of the seat cushion 3 and a backward tilting position where the seat back 2 is tilted substantially straight to the rear side. Among the rotation region described above, a rotation region of about 90 degrees from an upright position where the backrest angle of the seat back 2 is substantially straight to the upper side to the backward tilting position described above is set as a "lock region" in which the backrest angle of the seat back 2 is returned to a fixed state when the operation of pulling up the reclining lever 5 is released. Further, a rotation region for the backrest angle of the seat back 2 from the upright position to the forward tilting position described above is set as a "free region" in which the backrest angle of the seat back 2 is maintained in a released state without being returned to the fixed state even though the operation of pulling up the reclining lever 5 is released.

The lock region A1 and the free region A2 described above respectively correspond to a lock region A1 and a free region A2 set in the device 4 described later. With the setting of the free region A2 described above, when the reclining lever 5 is operated while a person is not seated on the seat 1, once the seat back 2 is tilted to a position that enters the free region A2 due to the biasing of the return spring 6 described above, the seat back 2 is tilted to a forward leaning position thereafter even if the operate on the reclining lever 5 is not continued. Here, the free region A2 described above corresponds to a "predetermined portion" of the ratchet 10 in the present invention.

As shown in FIGS. 2 and 3, specifically, the device 4 described above includes a ratchet 10 that is integrally coupled to an outer surface of the side frame 2F on each side of the seat back 2 described above, and a guide 20 that is integrally coupled to an inner surface of the reclining plate 3F on each side. The device 4 is configured such that the backrest angle of the seat back 2 is fixed or released by locking or unlocking the relative rotation between the ratchet 10 and the guide 20.

(Specific Configuration of Device 4)

Hereinafter, a specific configuration of the pair of left and right devices 4 described above will be described in detail. Since the devices 4 have the same configuration and are symmetrical with respect to each other, the configuration of one device arranged on the vehicle outer side (right side) shown in FIGS. 2 to 3 will be described as a representative in the following description.

Figure 4:
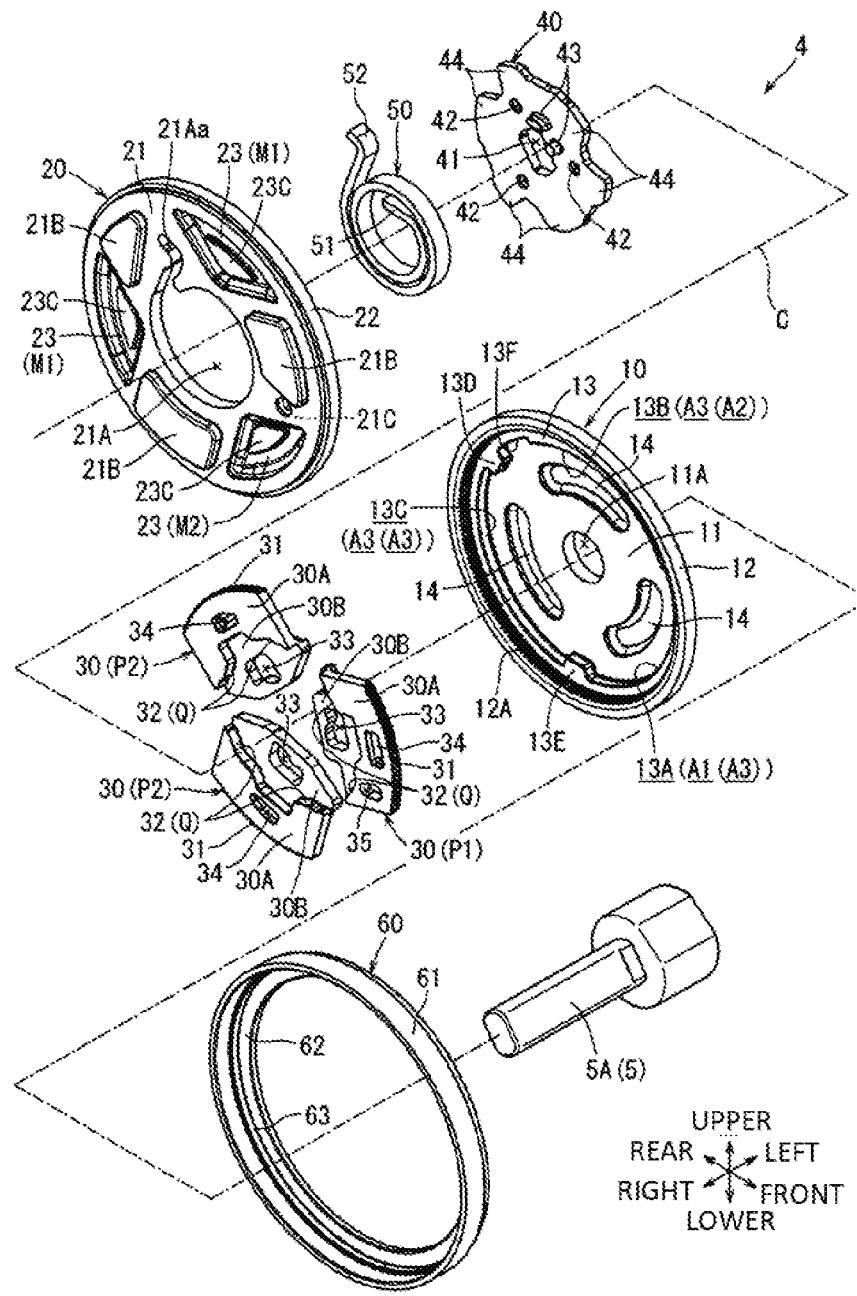
FIG. 4 is an exploded perspective view of the vehicle seat reclining device.
Figure 5:
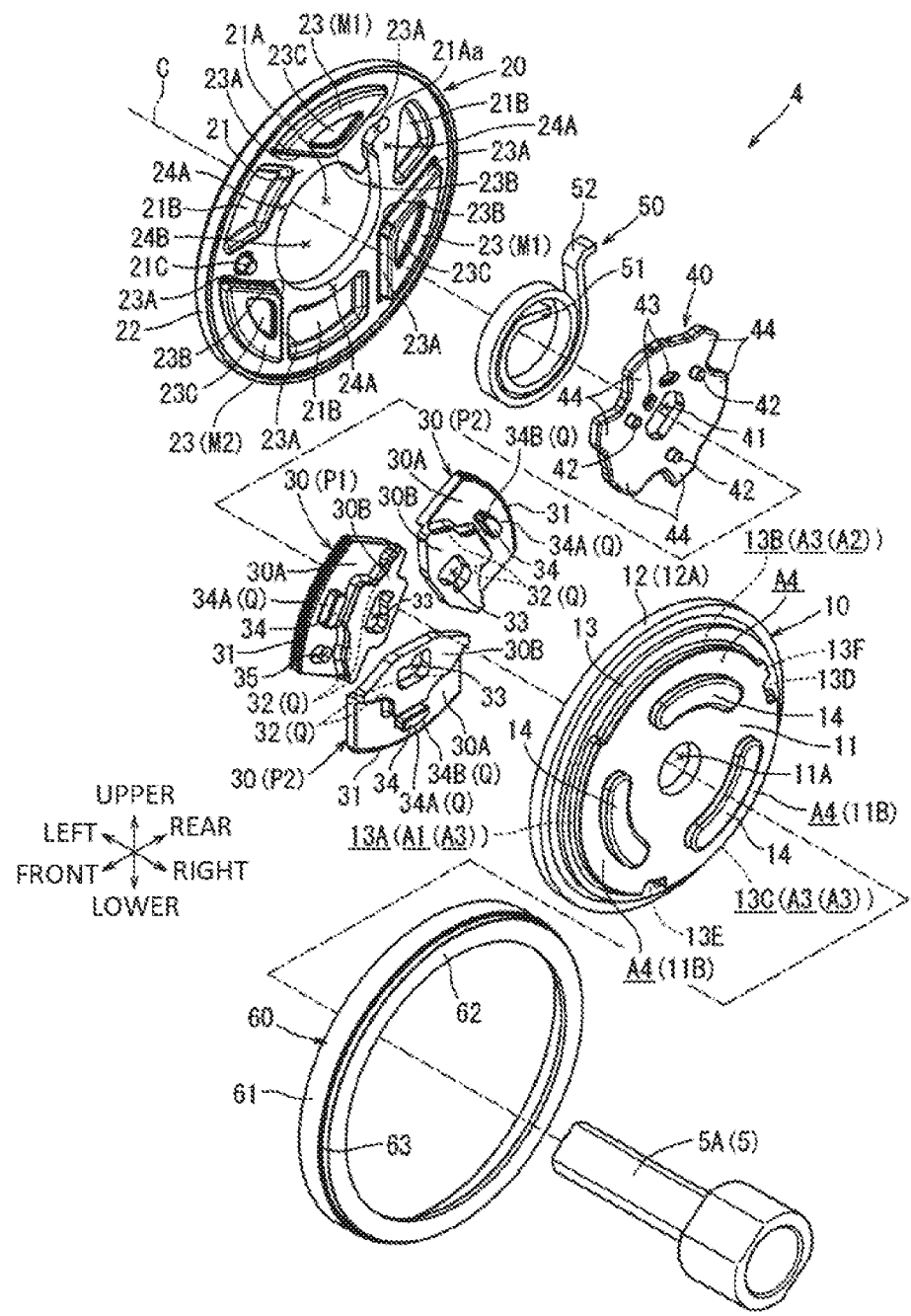
FIG. 5 is an exploded perspective view of FIG. 4 viewed from an opposite side.

As shown in FIGS. 4 and 5, the device 4 includes the substantially disc-shaped ratchet 10 and guide 20 that are assembled with each other in an axial direction, three poles 30 assembled between the ratchet 10 and guide 20, a rotating cam 40 configured to move these three poles 30 inward and outward in the radial direction, a lock spring 50 formed of a spiral spring that biases the rotating cam 40 against the guide 20 in a direction of a lock rotation movement, and a substantially cylindrical outer peripheral ring 60 that is mounted across outer peripheral portions of the ratchet 10 and the guide 20 so as to hold the ratchet 10 and the guide 20 in an assembled state in the axial direction. The ratchet 10, the guide 20, the three poles 30, and the rotating cam 40 are configured to be hardened by being subjected to a quenching treatment after the press molding such that a structural strength is enhanced. Here, the rotating cam 40 described above corresponds to a "cam" of the present invention. Hereinafter, a specific configuration of each member constituting the device 4 described above will be sequentially described in detail.

(Ratchet 10)

As shown in FIG. 4, the ratchet 10 is formed by one metal plate member being cut into a substantially disc shape and subjected to half blanking in places in a plate thickness direction (the axial direction).

Specifically, on an outer peripheral edge portion of a disc main body 11 of the ratchet 10 described above, a cylindrical portion 12 is formed to protrude in a substantially cylindrical shape in the axial direction, which is a direction of attachment to the guide 20. Specifically, the cylindrical portion 12 described above is formed by half blanking so that the outer peripheral edge portion of the disc main body 11 protrudes in two steps in the axial direction, and is formed in a stepped cylindrical shape having an inner and outer two-step cylindrical shape in which an intermediate cylindrical portion 13 that is smaller in the axial direction than the cylindrical portion 12 and protrudes in a substantially cylindrical shape is formed on an inner peripheral side.

An inner peripheral surface of the cylindrical portion 12 described above is formed with inner peripheral teeth 12A whose tooth surfaces face inward in the radial direction such that the inner peripheral teeth 12A are continuously arranged over an entire area in a peripheral direction. The inner peripheral teeth 12A described above are formed in a tooth surface shape with which outer peripheral teeth 31 formed on an outer peripheral surface of each pole 30 described later can be meshed by being pressed from an inner side in the radial direction. Specifically, the inner peripheral teeth 12A described above are configured such that the tooth surfaces are arranged in the peripheral direction at equal intervals with a pitch of 2 degrees from each other.

Further, an inner peripheral surface of the intermediate cylindrical portion 13 is formed with three peripheral directions (region 13A, region 13B, and region 13C) in which an inner diameter from the central portion (central axis C) and a length in the peripheral direction are individually set, a first projection 13D and a second projection 13E that protrude inward in the radial direction from a boundary of some of these regions, and an escape recess 13F that is recessed outward in the radial direction at a boundary position of the region 13C with the second projection 13E described above.

The region 13A, the region 13B, and the region 13C are each formed in an inner peripheral surface shape that is curved so as to draw an arc of a concentric circle around the central portion (central axis C). Specifically, the regions 13A and 13C are formed in an inner peripheral surface shape having a larger inner diameter than the region 13B, and the regions 13A and 13C are formed in an inner peripheral surface shape having the same inner diameter.

Figure 10:
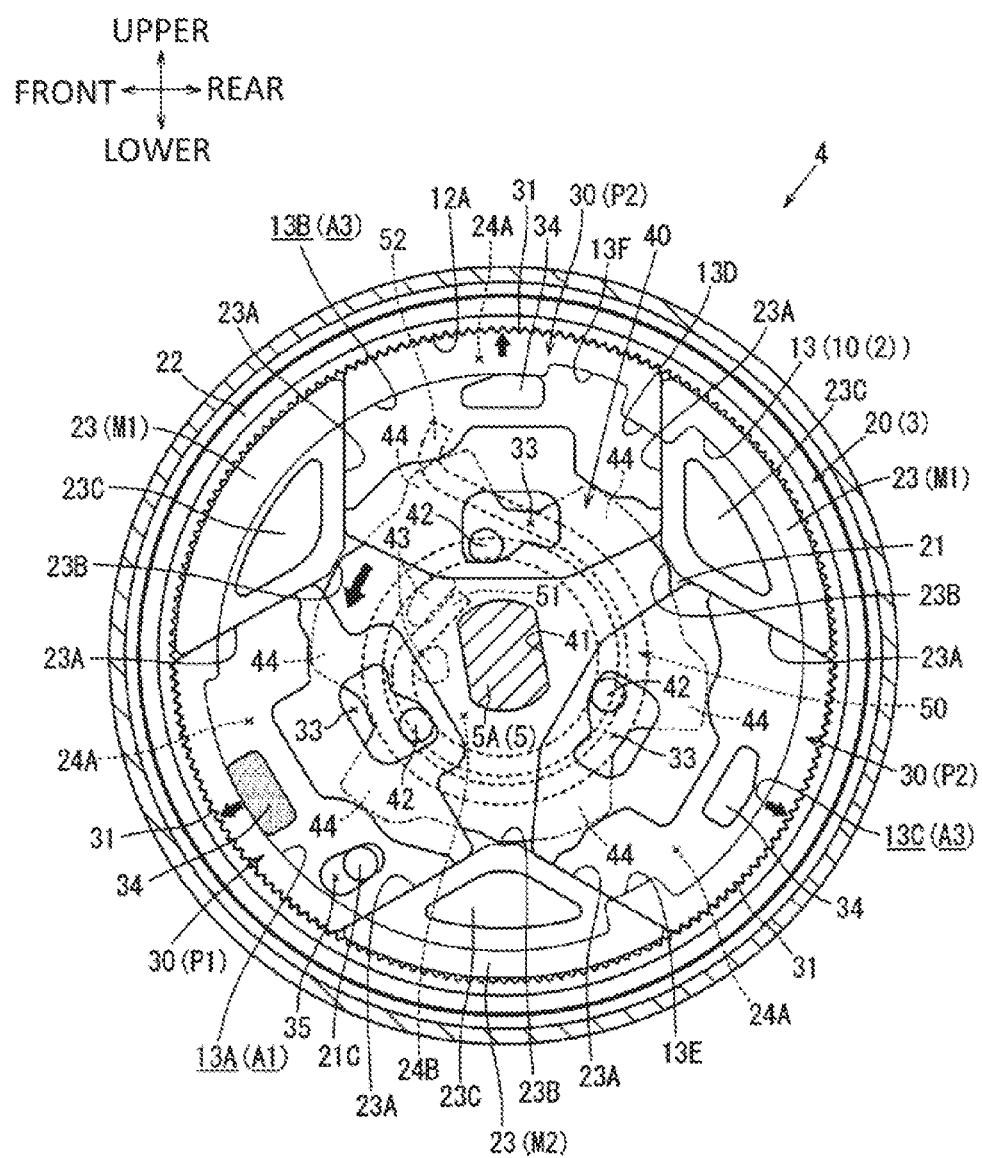
FIG. 10 is a sectional view taken along a line X-X of FIG. 8 showing a locked state of the vehicle seat reclining device.

As shown in FIGS. 10, 17(a) and 18(a), when a main pole P1 of the three poles 30 to be described later is arranged to overlap the region 13A in the peripheral direction by rotation of the ratchet 10, the region 13A described above constitutes the lock region A1 of the main pole P1 that allows the main pole P1 to move outward in the radial direction so as to mesh with the inner peripheral teeth 12A of the ratchet 10 and to be locked.

Further, when the main pole P1 is arranged to overlap the region 13A described above in the peripheral direction, the region 13B and the region 13C described above function as other regions A3 arranged to overlap the remaining two sub poles P2 of the three poles 30 in the peripheral direction, such that the sub poles P2 are allowed to move so as to mesh with the inner peripheral teeth 12A of the ratchet 10.

Figure 12:
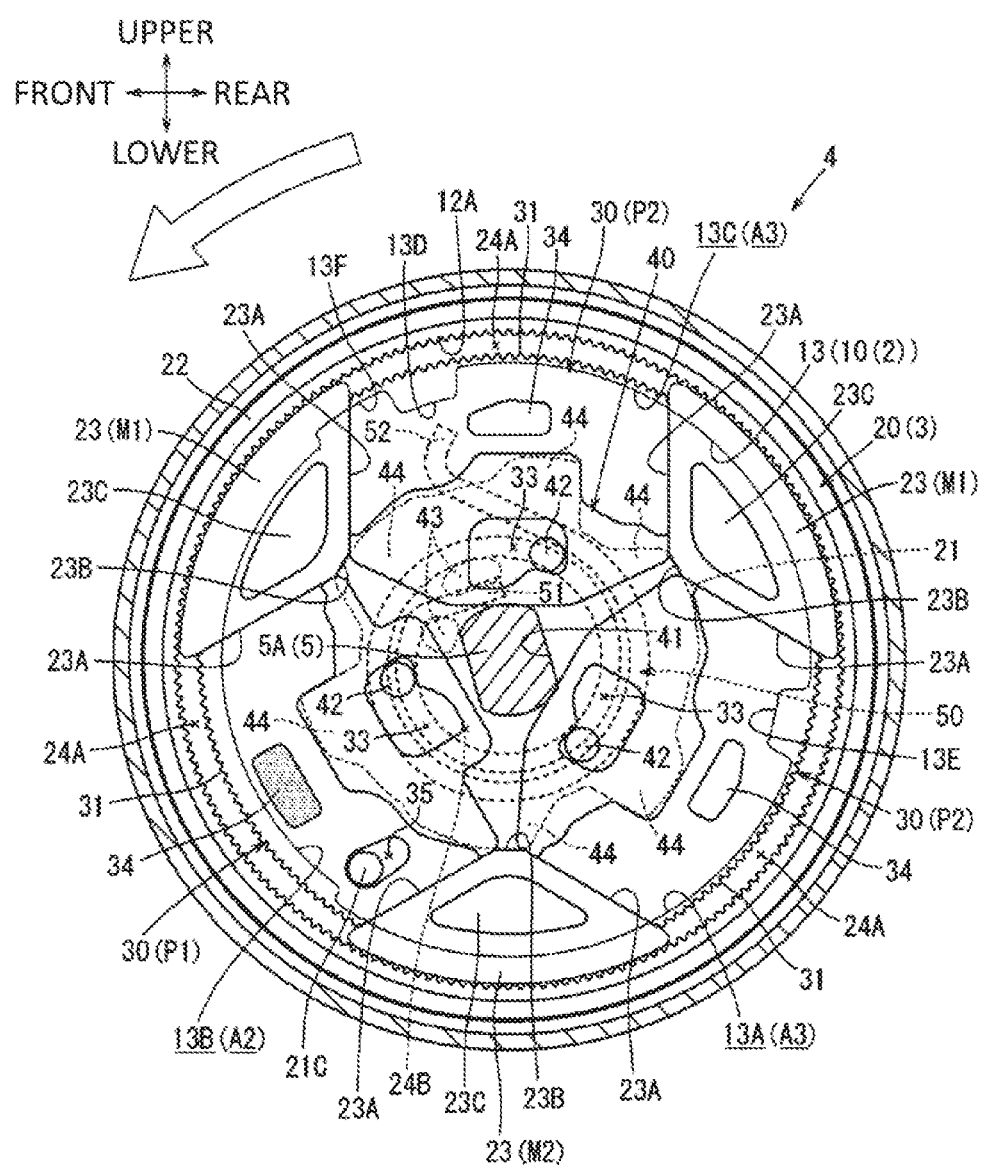
FIG. 12 is a sectional view showing a state in which a ratchet is turned to a free region from the state shown in FIG. 11.
Figure 13:
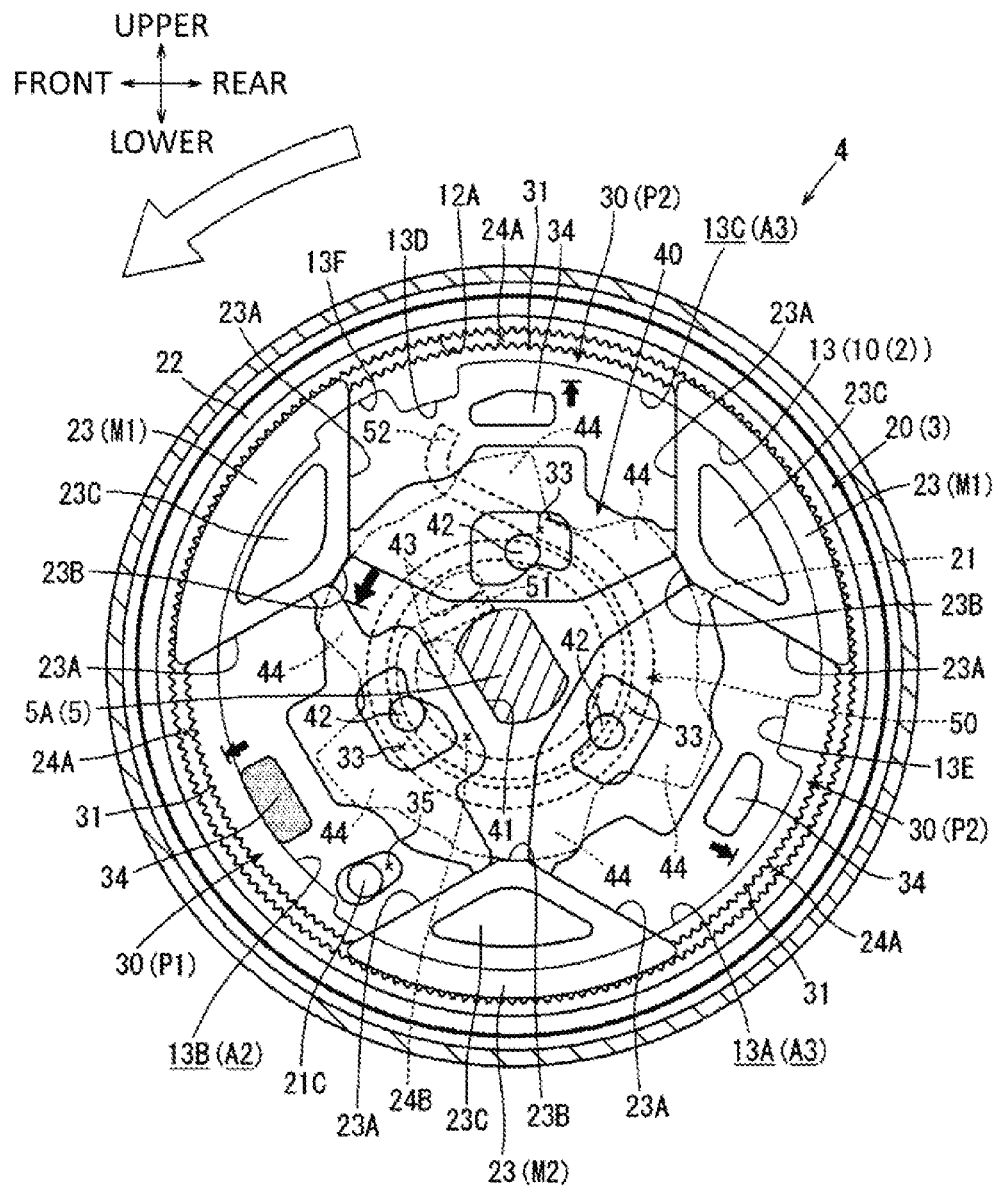
FIG. 13 is a sectional view showing a state in which a locking operation of the vehicle seat reclining device from the state shown in FIG. 12 is blocked.

However, when the main pole P1 described above is arranged to overlap the region 13B in the peripheral direction by rotation of the ratchet 10 as shown in FIG. 12, the region 13B configures the free region A2 of the main pole P1 that functions such that the main pole P1 rides on the free region A2 and stops moving outward in the radial direction to mesh with the inner peripheral teeth 12A of the ratchet 10 on the way as shown in FIGS. 13, 17(b), and 18(b).

When the main pole P1 is arranged to overlap the region 13B described above in the peripheral direction, the region 13C and the region 13A described above function as the other regions A3 arranged to overlap the remaining two sub poles P2 in the peripheral direction, such that movement of each sub pole P2 synchronized with the movement of the main pole P1 described above escapes in these regions.

That is, in the intermediate cylindrical portion 13 of the ratchet 10 described above, the region 13A described above constitutes the lock region A1 in which the lock operation of the main pole P1 is allowed (see FIGS. 10, 17(a) and 18(a)), and the region 13B constitutes the free region A2 in which the lock operation of the main pole P1 is blocked by riding and the ratchet 10 can be freely rotated in the peripheral direction while being held in the unlocked state (see FIGS. 13, 17(b) and 18(b)).

As shown in FIGS. 10, 17(a) and 18(a), when the main pole P1 is arranged to overlap the region 13A in the peripheral direction as described above, the region 13B and the region 13C function as the other regions A3 separately, so that the remaining two sub poles P2 are allowed to perform the lock operation in synchronization with the movement of the main pole P1. Further, as shown in FIGS. 13, 17(b) and 18(b), when the main pole P described above is arranged to overlap the region 13B in the peripheral direction by the rotation of the ratchet 10 described above, the region 13C and the region 13A function as the other regions A3 separately, so that the lock operation of the remaining two sub poles P2 performed in synchronization with the movement of the main pole P1 is blocked midway.

As described above, the intermediate cylindrical portion 13 of the ratchet 10 controls to allow and block the lock operation of the main pole P1 by the region 13A and the region 13B described above, and is configured such that the movement of the remaining two sub poles P2 in synchronization with the movement of the main pole P1 can escape by other regions (other regions A3) where the remaining two sub poles P2 are located at this time.

Figure 17:
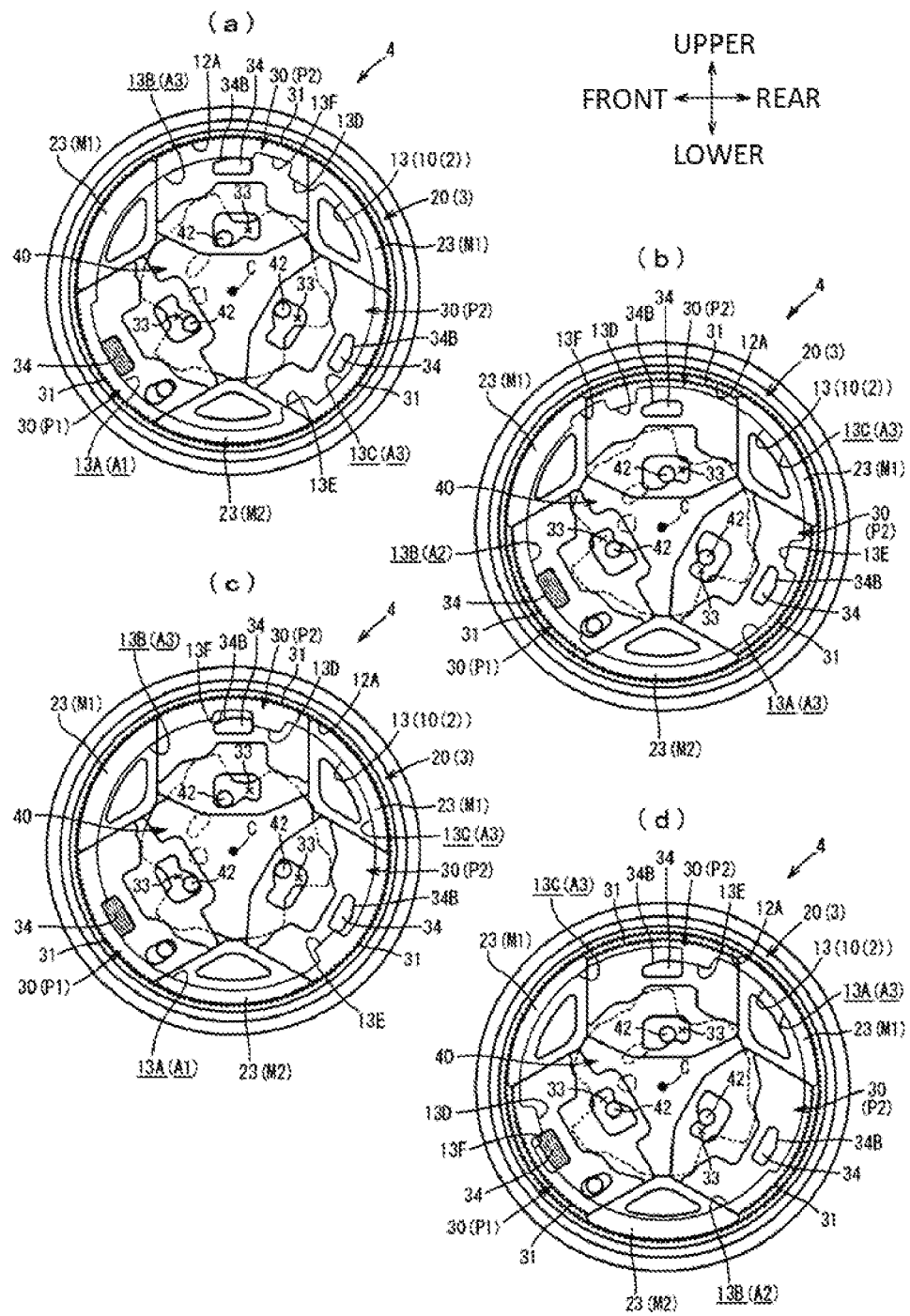
FIGS. 17(a) to 17(d) are sectional views showing the change of each pole in the locking operation in accordance with the change in a rotation position of the ratchet, divided into four cases.
Figure 18:
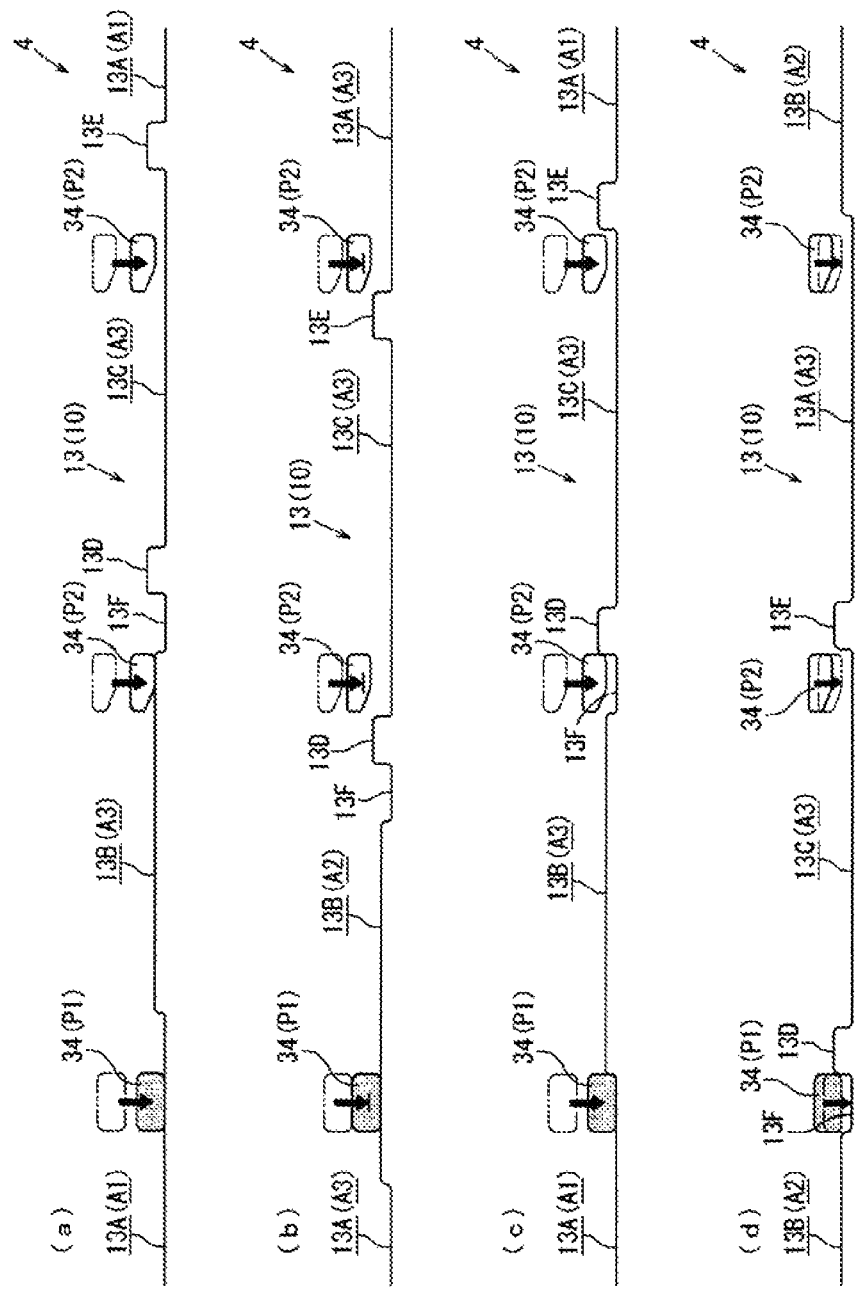
FIGS. 18(a) to 18(d) are schematic diagrams showing a positional relationship between riding protrusions of each pole and a protruding portion of the ratchet in FIGS. 17(a) to 17(d).
Figure 19:
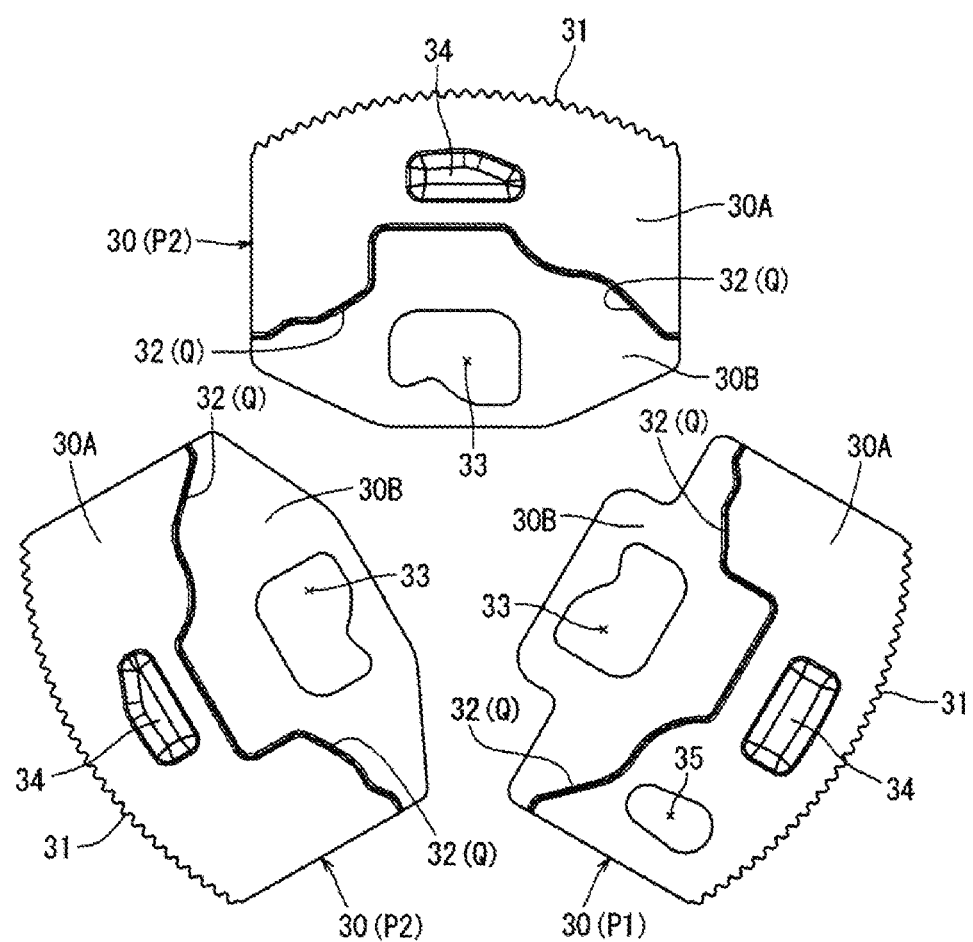
FIG. 19 is an outer side view of each pole.
Figure 20:
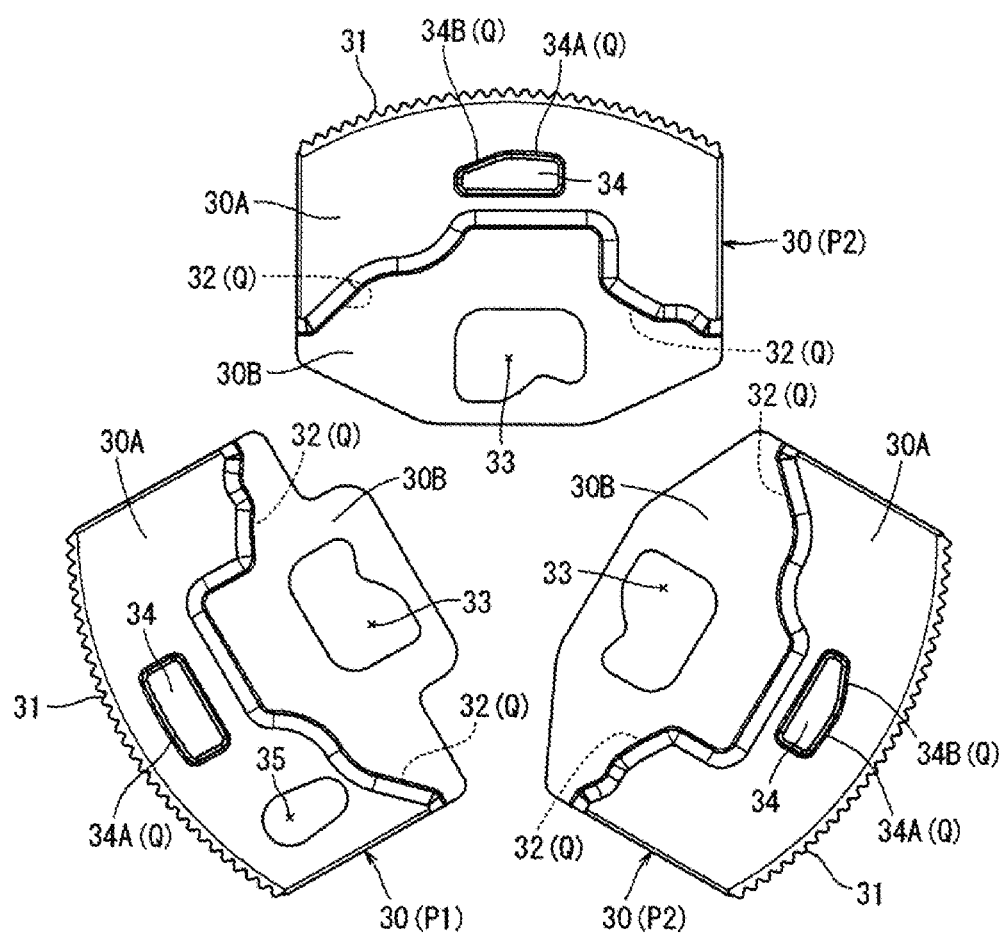
FIG. 20 is an inner side view of each pole.

In a case where the main pole P1 described above is pushed outward in the radial direction at a halfway point and is accidentally pressed against a step between the region 13A and the region 13B in the peripheral direction when being moved from the lock region A1 (region 13A) to the free region A2 (region 13B) by the rotation of the ratchet 10 (i.e. in a case where the arrangement is shown in FIGS. 17(b) and 18 (b)), the first projection 13D and the second projection 13E function to come into contact with these two sub poles P2 at the same time as shown in FIGS. 17(c) and 18 (c) so as to distribute a load caused thereby to the other two sub poles P2 instead of concentrate only on the main pole P1.

That is, when the main pole P described above is pressed against the step between the region 13A and the region 13B in the peripheral direction due to the rotation of the ratchet 10, the first projection 13D and the second projection 13E described above are formed at positions where the first projection 13D and the second projection 13E are pressed against the remaining two sub poles P2 in the peripheral direction.

Figure 14:
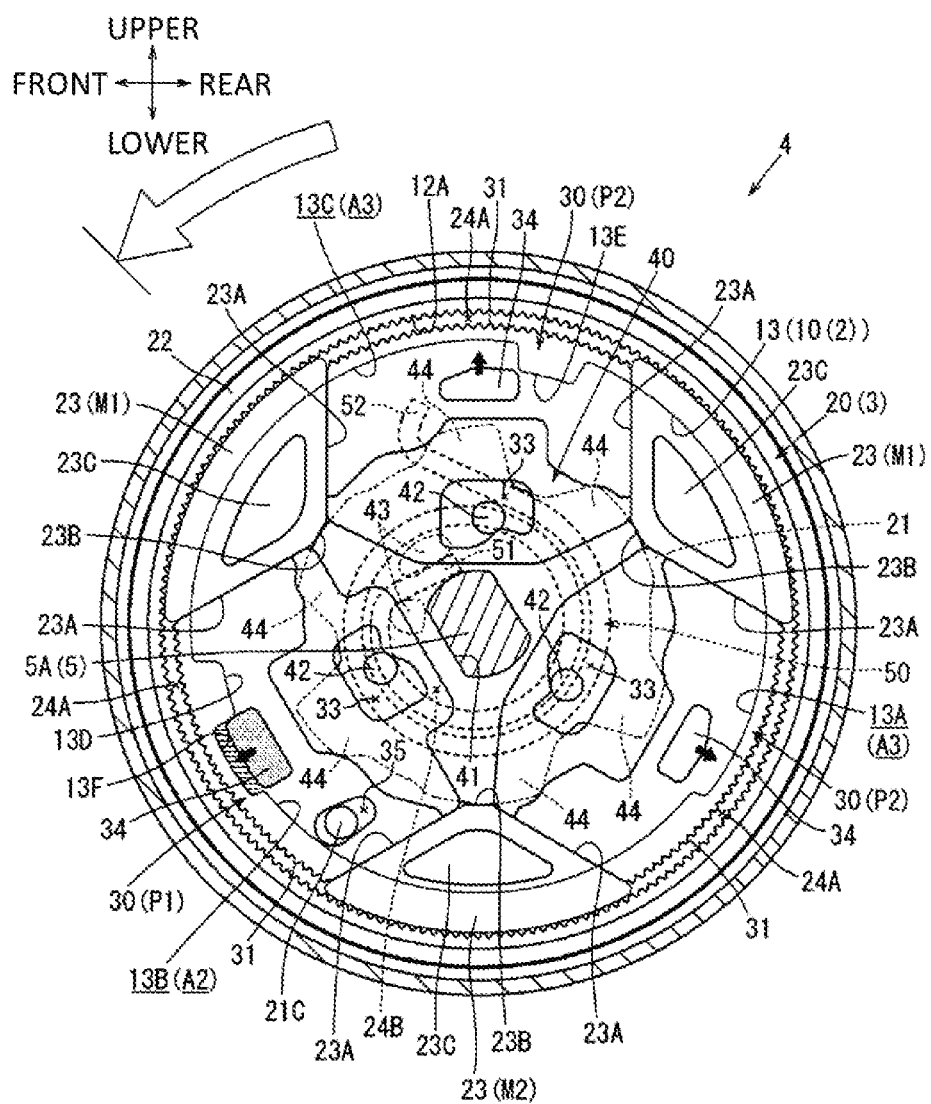
FIG. 14 is a sectional view showing a state in which the ratchet is turned to an end position of the free region from the state shown in FIG. 12.

As shown in FIGS. 14, 17(d), and 18(d), when the main pole P1 described above moves to an end position in the peripheral direction on the region 13B which is the free region A2 due to the rotation of the ratchet 10, the escape recess 13F is configured to be disengaged from the riding state so that the main pole P can be meshed with the inner peripheral teeth 12A of the ratchet 10 at that position. By the escape recess 13F, the ratchet 10 is tilted down to an end position of the free region A2, that is, the forward tilting position where the seat back 2 is folded up on the upper surface of the seat cushion 3 described above with reference to FIG. 1, so that the device 4 is locked at that position and the seat back 2 can be switched to a state where the rotation is stopped. As a result, the seat back 2 can be locked in the forward tilting position so as not to loosely move.

As shown in FIGS. 4 and 5, a through hole 11A penetrating in around hole shape is formed at a central portion (on the central axis C) of the disc main body 11 of the ratchet 10 described above. An operation pin 5A, which is inserted and mounted in a central portion (on the central axis C) of the rotating cam 40 described later, is inserted through the through hole 11A in a rotation-free state from an outer side in the axial direction. Further, as shown in FIG. 5, on an outer surface of the disc main body 11 of the ratchet 10 described above, projections (hereinafter, referred to as "dowels 14") that protrude by being pushed out in an arcuate shape in the axial direction are formed at three positions in the peripheral direction, which are positions arranged on the same circumference around the central portion (on the central axis C) of the disc main body 11.

The dowels 14 described above are formed in such a manner that one dowel is housed in each forming region in the peripheral direction in which the region 13A, the region 13B, and the region 13C of the intermediate cylindrical portion 13 described above are formed. As shown in FIG. 3, the ratchet 10 having the configuration described above is assembled in such a manner that the outer surface of the disc main body 11 thereof is in surface contact with the outer surface of the side frame 2F of the seat back 2 described above, and a contact portion therebetween in welded so that the ratchet 10 is integrally coupled to the side frame 2F of the seat back 2 (welding portion W).

Specifically, the ratchet 10 described above is assembled in a state where three dowels 14 formed on the outer surface of the disc main body 11 are respectively fitted in three fitting holes 2Fa correspondingly formed in the side frame 2F of the seat back 2 and penetrating in a substantially arc shape, and peripheral regions (coupling regions A4) of these fitted parts are joined and coupled by laser welding in a state of surface contact with the side frame 2F (welding portion W).

Figure 7:
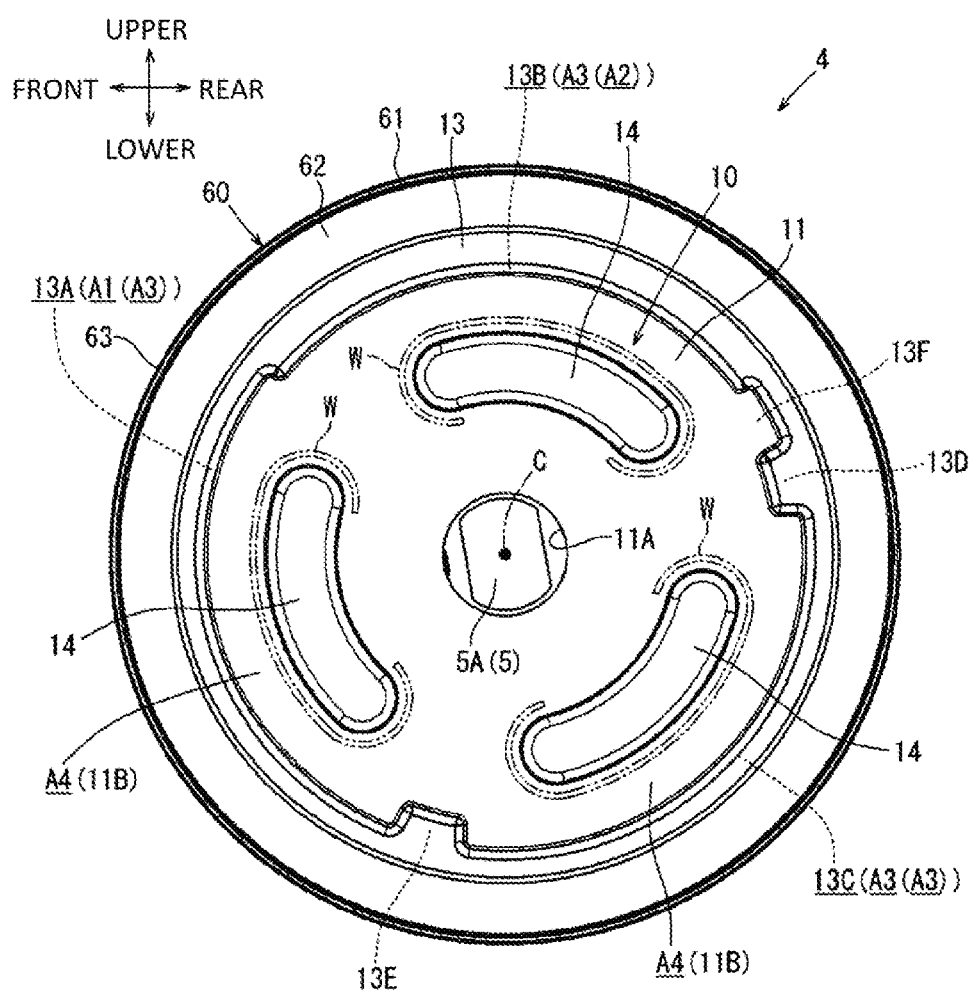
FIG. 7 is an inner side view of the vehicle seat reclining device.
Figure 8:
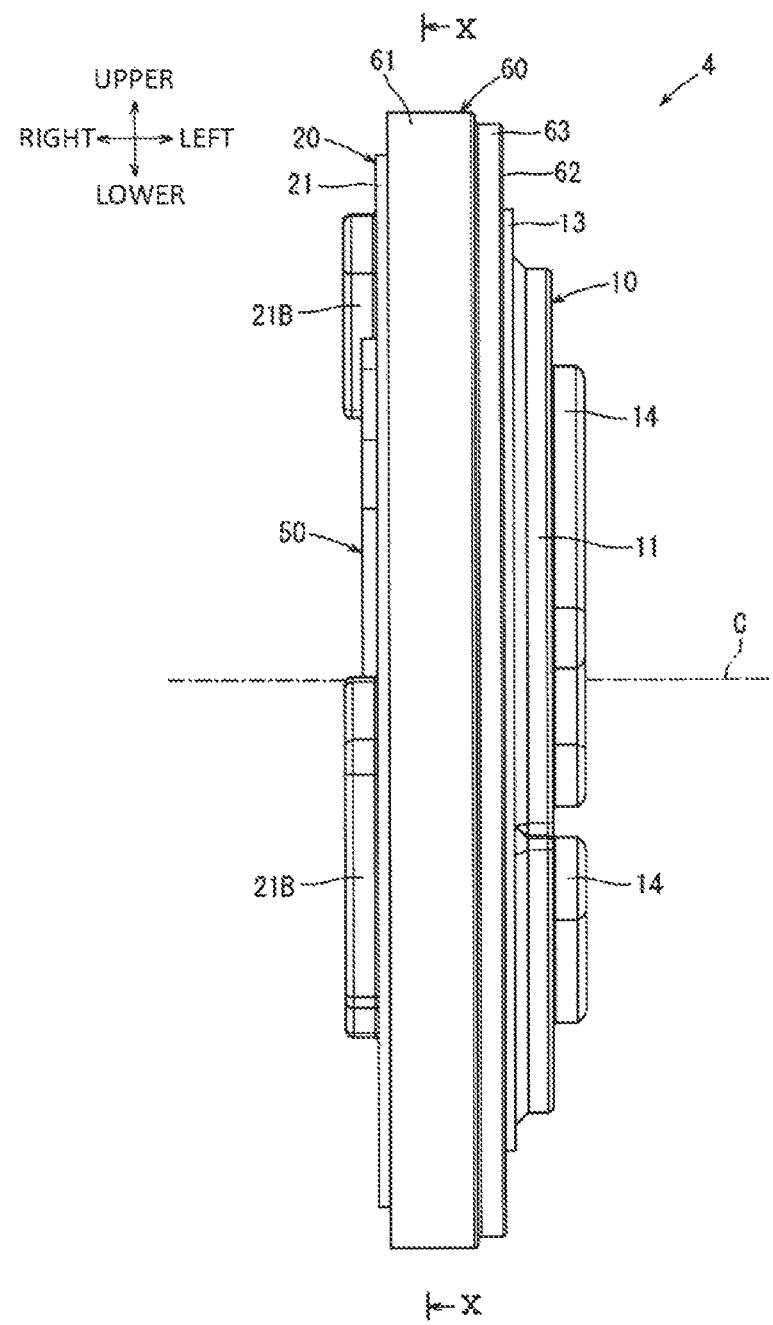
FIG. 8 is a front side view of the vehicle seat reclining device.

More specifically, the outer surface of the disc main body 11 of the ratchet 10 described above is formed with the coupling regions A4 which are abutted against the side frames 2F in a surface contact state and laser-welded on the outer side in the radial direction and on both sides in the peripheral direction of the regions where these three dowels 14 are formed. As shown in FIG. 7, the coupling regions A4 described above are configured such that the region 13A and the region 13C of the intermediate cylindrical portion 13 which are formed on the outer peripheral edges of respective coupling regions A4 are located at positions on the outer side in the radial direction than the region 13B. Therefore, the coupling regions A4 are configured such that regions in the forming regions in the peripheral direction in which the region 13A and the region 13C are formed each have an expansion surface portion 11B whose area is expanded in the radial direction as compared with a region in the forming region in the peripheral direction in which the region 13B is formed.

According to such a configuration, the outer surface of the disc main body 11 of the ratchet 10 described above is configured such that these two coupling regions A4 that each have the expansion surface portion 11B in the respective forming regions in the peripheral direction in which the region 13A and the region 13C are formed are firmly welded to the side frames 2F more widely abutted toward the outer side in the radial direction than the one coupling region A4 in the forming region in the peripheral direction in which the region 13B is formed.

More specifically, the welding of the outer surface of the disc main body 11 of the ratchet 10 described above to the side frames 2F is performed in such a manner that each dowel 14 is surrounded from an outer region in the radial direction across both side regions in the peripheral direction in a C-shape so that welding beads are inserted (welding portion W). The side frame 2F described above is formed with a passage hole 2Fb that allows the operation pin 5A, which is passed through the through hole 11A formed at the central portion (on the central axis C) of the ratchet 10 described above, to pass through toward the outer side in the axial direction.

(Guide 20)

As shown in FIG. 5, the guide 20 is formed by one metal plate member being cut into a substantially disc shape with an outer diameter slightly larger than that of the ratchet 10 and subjected to the half blanking in places in the plate thickness direction (the axial direction).

Figure 9:
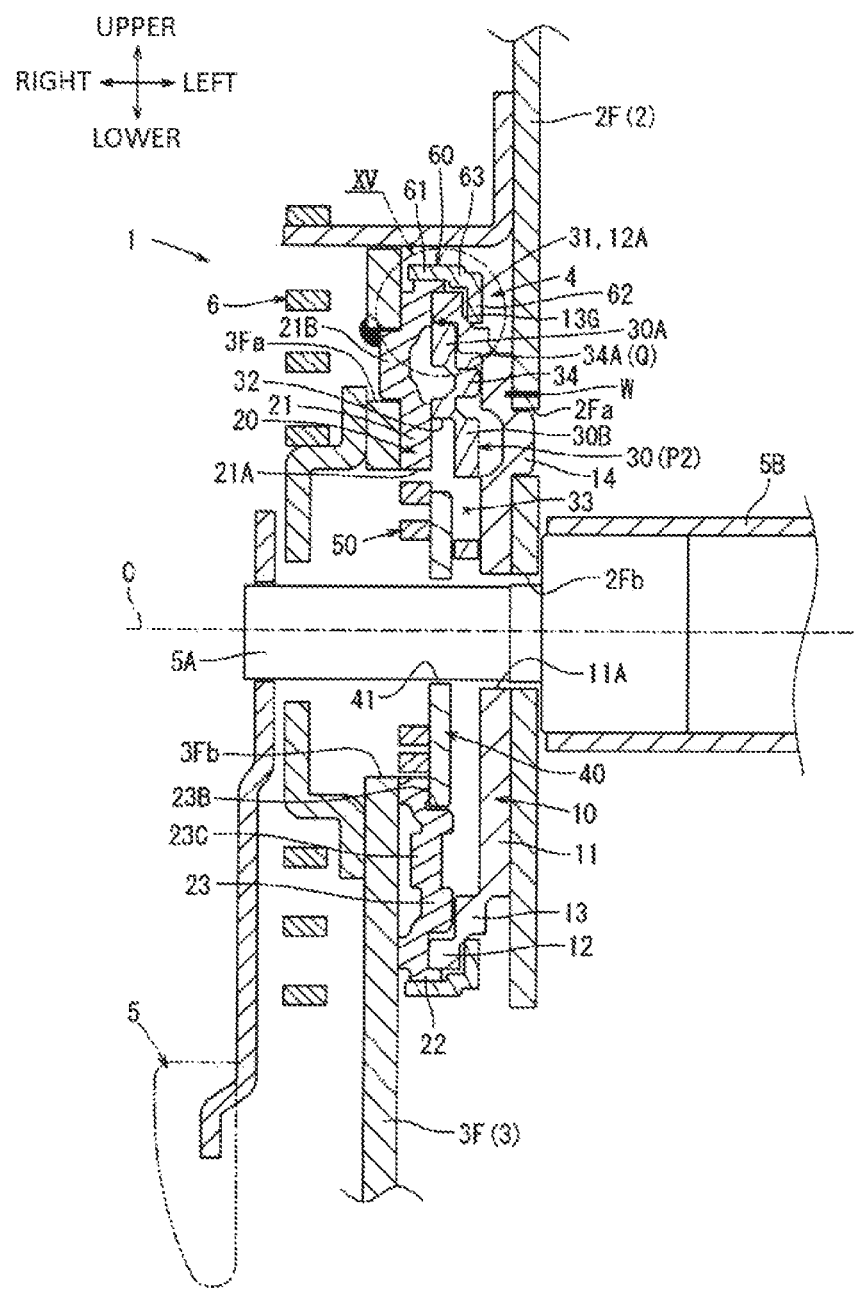
FIG. 9 is a sectional view taken along a line IX-IX of FIG. 1.

Specifically, on an outer peripheral edge portion of a disc main body 21 of the guide 20 described above, a cylindrical portion 22 is formed to protrude in a substantially cylindrical shape in the axial direction, which is a direction of attachment to the ratchet 10. The cylindrical portion 22 is formed such that an inner diameter thereof is slightly larger than the outer diameter of the cylindrical portion 12 of the ratchet 10 described above. As shown in FIG. 9, the guide 20 described above is set such that the cylindrical portion 12 of the ratchet 10 described above is inserted into the cylindrical portion 22 of the guide 20 in the axial direction.

Accordingly, the guide 20 and the ratchet 10 are assembled in a state where the respective cylindrical portions 22, 12 thereof are loosely fitted with each other inward and outward in the radial direction, such that relative rotation therebetween is enabled in a state of being supported inward and outward. Then, the guide 20 described above is mounted in a state where the outer peripheral ring 60 to be described later crosses from an outer peripheral side between the cylindrical portion 22 and the cylindrical portion 12 of the ratchet 10 described above, so that the guide 20 is assembled while being prevented from coming off the ratchet 10 in the axial direction via the outer peripheral ring 60 (see FIGS. 2 and 3, and FIGS. 6 to 9).

As shown in FIG. 5, guide walls 23 which are formed by being pushed out in a half-blanking shape so as to protrude in a substantially fan shape in the axial direction, which is a direction of assembling to the ratchet 10, are formed at three positions in the peripheral direction on an inner surface of the disc main body 21 of the guide 20 described above. These guide walls 23 are formed such that respective outer peripheral surfaces thereof in the radial direction are curved so as to draw arcs of a concentric circular drawn around a central portion (central axis C) thereof. Each of the guide walls 23 described above is set so as to be loosely fitted into the cylindrical portion 12 of the ratchet 10 which is assembled in the cylindrical portion 22 of the guide 20 described above.

By forming the guide walls 23 described above, pole accommodating grooves 24A are formed in regions among arrangement of the guide walls 23 in the peripheral direction on the inner surface of the disc main body 21 described above, so that each of the three poles 30 described later can be set to be slidable inward and outward in the radial direction. Further, a cam accommodating groove 24B is formed in a center region on the inner surface of the disc main body 21 surrounded by the guide walls 23 described above, so that the rotating cam 40 described later can be set to be rotated axially.

Figure 11:
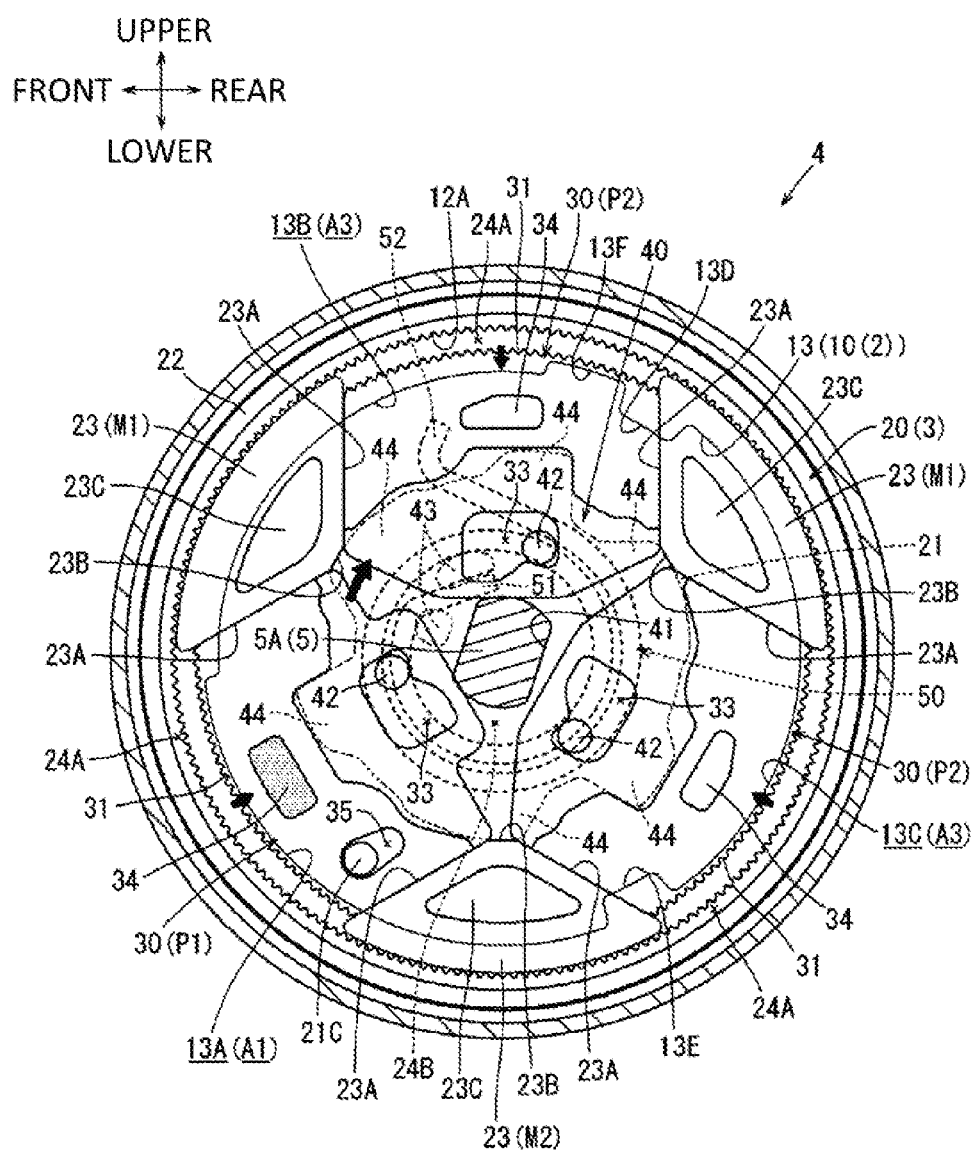
FIG. 11 is a sectional view corresponding to FIG. 10 showing an unlocked state of the vehicle seat reclining device.

As shown in FIGS. 10 and 11, the guide walls 23 described above are applied to the respective poles 30 set correspondingly in the pole accommodating grooves 24A described above so as to face each other from both sides in the peripheral direction by restriction surfaces 23A, which are both side surfaces in the peripheral direction facing each pole accommodating groove 24A, and are configured to support each pole 30 from both sides in the peripheral direction so as to guide each pole 30 to be slidable only inward and outward in the radial direction.

Further, the guide walls 23 described above are applied to the rotating cam 40 set in the cam accommodating groove 24B described above so as to face each other from the outer side in the radial direction by a support surface 23B, which is an inner peripheral surface in the radial direction facing the cam accommodating groove 24B, and are configured to support the rotating cam 40 from the outer side in the radial direction so as to guide the rotating cam 40 at the central portion (on the central axis C) on the disc main body 21 of the guide 20 to be rotatable only in the peripheral direction.

As described in FIG. 5, a play filling pin 21C that is inserted into a wedge-shaped play filling hole 35 formed in the main pole P1 so as to protrude in a columnar shape in the axial direction is formed on a forming region of the pole accommodating groove 24A in which the main pole P1 is set on the inner surface of the disc main body 21 of the guide 20 described above. As shown in FIG. 11, when the main pole P described above is pulled inward in the radial direction and is not meshed with the inner peripheral teeth 12A of the ratchet 10, the play filling pin 21C described above is located in an outer region of the wedge-shaped play filling hole 35 in the radial direction where a hole width is wide and does not block the movement of the main pole P1.

However, as shown in FIG. 10, as the main pole P1 is pushed outward in the radial direction and meshed with the inner peripheral teeth 12A of the ratchet 10, the play filling pin 21C described above is pressed into an inner region in the radial direction where the hole width is narrow in the wedge-shaped play filling hole 35 of the main pole P1, so that the play filling pin 21C can be switched to a state in which the play of the main pole P1 in the peripheral direction is prevented. According to such a configuration, the main pole P1 is meshed with the inner peripheral teeth 12A of the ratchet 10 in a state where the play in the peripheral direction is prevented, and the ratchet 10 and the guide 20 are locked via the main pole P1 in a state where the play in the peripheral direction therebetween is prevented.

As shown in FIGS. 4 and 5, each of the guide walls 23 described above is formed with a floating island-shaped bead portion 23C that is pushed out in a half-blanking shape toward a side opposite to the axial direction which is the direction of assembling to the ratchet 10 at an intermediate portion where a peripheral edge of a protruding region whose shape is expanded in the peripheral direction and the radial direction is left. Each bead portion 23C is formed as described above, so that each guide wall 23 is configured to have high structural strength capable of firmly supporting each pole 30 from both sides in the peripheral direction without reducing a contact area with each pole 30 for supporting each pole 30 from both sides in the peripheral direction by the restriction surfaces 23A.

Further, at the central portion (on the central axis C) of the disc main body 21 of the guide 20 described above, a through hole 21A penetrating in a substantially round hole shape is formed in which the lock spring 50 to be described later is accommodated. The through hole 21A described above is formed with a hanging hole 21Aa which extends a slender hole shape from a part of a hole shape of the through hole 21A toward the outer side in the radial direction. An outer end portion 52 of the lock spring 50 set in the through hole 21A described above is fitted into the hanging hole 21Aa in the axial direction so as to be integrally fixed in the peripheral direction.

As shown in FIG. 4, dowels 21B protruding in a substantially cylindrical shape in the axial direction are formed on an outer surface of the disc main body 21 of the guide 20 described above at three positions in the peripheral direction. Each of these dowels 21B is formed in such a manner that it is pushed out in the axial direction one by one in regions corresponding to back sides of respective pole accommodating grooves 24A described above on the outer surface of the disc main body 21 described above.

As shown in FIG. 2, the guide 20 having the configuration described above is in a state of being firmly and integrally coupled to the reclining plate 3F by the dowels 21B protruding from the outer surface of the disc main body 21 described above being fitted into and welded with the corresponding fitting holes 3Fa formed in the reclining plate 3F. The reclining plate 3F described above is formed with a passage hole 3Fb that allows the operation pin 5A, which is passed through the through hole 21A formed at the central portion (on the central axis C) of the guide 20 described above, to pass through toward the outer side in the axial direction.

(Pole 30)

As shown in FIGS. 4 and 5, these three poles 30 are separately formed by one metal plate member being cut into a substantially rectangular shape and subjected to the half blanking in places in the plate thickness direction (the axial direction). Specifically, each pole 30 described above has a shape in which an offset surface portion 30B forming a region on an inner peripheral side in the radial direction of the poles is pushed out in a half-blanking shape by an amount corresponding to a substantially plate thickness in the axial direction, which is the direction of assembling to the ratchet 10, with respect to a main body surface portion 30A forming a region on an outer peripheral side. Here, the offset surface portion 30B described above corresponds to an "operation surface portion" of the present invention.

Further, a specific one pole of the three poles 30 described above is configured as the main pole P1 that has a partly different shape from the other two sub poles P2 so as to be functionally distinguished. The specific difference will be described later.

As shown in FIGS. 10 and 11, each pole 30 described above is set so as to be accommodated one by one in respective pole accommodating grooves 24A formed on the inner surface of the disc main body 21 of the guide 20 described above. With such a setting, each pole 30 is provided in a state of being supported in a planar shape from both sides in the peripheral direction by the restriction surfaces 23A of the guide walls 23 facing the respective pole accommodating grooves 24A from both sides in the peripheral direction, and is supported so as to be movable only inward and outward in the radial direction along the restriction surfaces 23A.

Specifically, as shown in FIG. 9, when each pole 30 described above is set in the respective pole accommodating grooves 24A described above, the main body surface portions 30A of the poles 30 are set so as to be abutted against the inner surface of the disc main body 21 of the guide 20. Therefore, each of the poles 30 is set such that the inner peripheral teeth 12A of the cylindrical portion 12 of the ratchet 10 assembled in the cylindrical portion 22 of the guide 20 described above face each other in the radial direction at a position on the outer side in the radial direction of the main body surface portion 30A.

Further, the offset surface portion 30B of each pole 30 described above is set so as to be spaced from the inner surface of the disc main body 21 of the guide 20 described above in the axial direction, and to overlap the intermediate cylindrical portion 13 of the ratchet 10 described above in the axial direction.

As shown in FIG. 4, on an outer peripheral surface in the radial direction of the main body surface portions 30A of each pole 30 described above, the outer peripheral teeth 31 whose tooth surfaces face outward in the radial direction are formed in a shape that is continuously arranged over an entire area in the peripheral direction. The outer peripheral surface in the radial direction on which the outer peripheral teeth 31 of each pole 30 described above are formed is formed into a curved surface shape along the inner peripheral surface of the cylindrical portion 12 on which the inner peripheral teeth 12A of the ratchet 10 described above are formed.

According to such a configuration, the outer peripheral teeth 31 of each pole 30 are pressed against the inner peripheral teeth 12A of the ratchet 10 from the inner side in the radial direction, so that the entire teeth are meshed with the inner peripheral teeth 12A of the ratchet 10. Specifically, the outer peripheral teeth 31 of each pole 30 are configured such that the tooth surfaces are arranged in the peripheral direction at equal intervals with a pitch of 2 degrees from each other, as the inner peripheral teeth 12A of the ratchet 10 to be meshed with the outer peripheral teeth 31.

However, more strictly, with reference to FIG. 10, the outer peripheral teeth 31 of each pole 30 described above are formed in such manner that tooth surfaces at the center in the peripheral direction enter and mesh deepest with the inner peripheral teeth 12A of the ratchet 10, and a tooth height becomes smaller as the entering depth with respect to the inner peripheral teeth 12A of the ratchet 10 gradually decreases toward both end sides in the peripheral direction.

According to such a configuration, in each pole 30, in addition to the tooth surfaces at the center position where the tooth surfaces are oriented straight in an entering direction thereof, other tooth surfaces where direction of the tooth surfaces is tilted in a direction different from the entering direction from the same center position toward both end sides in the peripheral direction can also be appropriately meshed with the tooth surfaces of the corresponding inner peripheral teeth 12A of the ratchet 10 by the movement of each pole 30 toward the outer side in the radial direction without being replaced. The specific tooth surface shape of the outer peripheral teeth 31 is the same as that disclosed in the literature such as JP-A-2015-29635, and therefore a detailed description thereof will be omitted.

According to such a configuration, when the outer peripheral teeth 31 are meshed with the inner peripheral teeth 12A of the ratchet 10, each pole 30 may receive an action of a biased force such that the entire body is pushed and tilted in either one of the peripheral directions by an action of a pressing force from the inner side in the radial direction, with the deepest meshed center position in the peripheral direction as a fulcrum. However, the above action is appropriately suppressed by the action of the play filling pin 21C provided on the guide 20 being pressed into the wedge-shaped play filling hole 35 with the play being filled in the peripheral direction when the main pole P1 is to be meshed with the ratchet 10.

As shown in FIG. 9, each pole 30 described above is set in such a manner that the rotating cam 40 which is described later and set at the central portion (on the central axis C) of the guide 20 faces the radial direction in a region at the inner side of the radial direction surrounded by the main body surface portions 30A. With such a setting, each pole 30 is configured such that the main body surface portions 30A are provided side by side at positions on the outer side in the radial direction of the rotating cam 40, and the offset surface portions 30B are provided so as to overlap the rotating cam 40 in the axial direction.

Here, as shown in FIG. 5, the inner peripheral surface of the main body surface portion 30A of each pole 30 described above is formed with pressed surface portions 32 which face the rotating cam 40 described above in the radial direction and which receive an acting force pressed from the inner side to the outer side in the radial direction as the rotating cam 40 rotates. Further, a pull-in hole 33 is formed at an intermediate portion of the offset surface portion 30B of each pole 30 described above and penetrates in the axial direction so as to be operated such that a corresponding pull-in pin 42 formed on the rotating cam 40 described above is inserted therein and pulled inward in the radial direction as the rotating cam 40 rotates. Further, at an intermediate portion of the main body surface portion 30A of each pole 30 described above, a riding protrusion 34 that is pushed out in a half-blanking shape in the same axial direction as the offset surface portion 30B is formed. Here, the riding protrusion 34 described above corresponds to a "protrusion" of the present invention.

As shown in FIG. 10, the rotating cam 40 described above is rotated in a counterclockwise direction in the figure by a spring biasing force of the lock spring 50 described later which is hooked between the rotating cam 40 and the guide 20, so that the pressed surface portions 32 of each pole 30 described above is pressed from the inner side to the outer side in the radial direction by a corresponding pressing portion 44 formed on an outer peripheral surface portion of the rotating cam 40. By the above pressing, the outer peripheral teeth 31 of each pole 30 are pressed against the inner peripheral teeth 12A of the ratchet 10 described above to be meshed with each other, and are held in such a meshed state. As a result, the poles 30 are integrally coupled to the ratchet 10 in the peripheral direction, and the relative rotation between the ratchet 10 and the guide 20 is locked via each pole 30.

Further, as shown in FIG. 11, the rotating cam 40 described above is rotated in a clockwise direction shown in the figure against the spring biasing force of the lock spring 50 by the operation of the reclining lever 5 described above, so that the pull-in hole 33 of each pole 30 described above is pulled inward in the radial direction by the corresponding pull-in pin 42 of the rotating cam 40 inserted therein. By the above pulling, the outer peripheral teeth 31 of each pole 30 do not mesh with the inner peripheral teeth 12A of the ratchet 10 described above, and are held in such a state (unlocked state). Asa result, the rotation locked state between the ratchet 10 and the guide 20 described above is released.

As shown in FIG. 9, the riding protrusion 34 of each pole 30 described above is pushed out in a half-blanking shape in the same axial direction as the offset surface portion 30B of each pole 30 described above to the same position, and an outer peripheral surface portion 34A thereof is provided so as to face the inner peripheral surface of the intermediate cylindrical portion 13 of the ratchet 10 described above in the radial direction. As shown in FIGS. 10, 17(*a*), and 18(*a*), when a rotation position of the ratchet 10 described above with respect to the guide 20 is in the state of the lock region A1 described above, even if each pole 30 described above is pushed outward in the radial direction by the rotating cam 40, the riding protrusion 34 of each pole 30 described above is not pressed against the inner peripheral surface of the intermediate cylindrical portion 13 of the ratchet 10 so that the movement of each pole 30 meshing with the inner peripheral teeth 12A of the ratchet 10 is not blocked.

However, as shown in FIGS. 13, 17(*b*), and 18(*b*), by changing the rotation position of the ratchet 10 described above with respect to the guide 20 to the state of the free region A2 described above, when each pole 30 described above is pushed outward in the radial direction by the rotating cam 40, the riding protrusion 34 of each pole 30 described above is pressed against the inner peripheral surface of the intermediate cylindrical portion 13 of the ratchet 10 to ride up, so that the movement of each pole 30 meshing with the inner peripheral teeth 12A of the ratchet 10 is stopped at an intermediate position.

Specifically, the riding protrusions 34 of each pole 30 described above are configured such that diameter dimensions from the central portion (on the central axis C) of the guide 20 to the outer peripheral surface portion 34A of the main pole P1 and the other two sub poles P2 are different from each other, that is, forming positions in the radial direction are different from each other. Specifically, the riding protrusion 34 of the main pole P1 is formed at a position which is projected more outward in the radial direction than the riding protrusions 34 of the other two sub poles P2.

As shown in FIGS. 10, 17(*a*) and 18(*a*), when the riding protrusion 34 of the main pole P1 described above is arranged to overlap the region 13A (lock region A1) of the intermediate cylindrical portion 13 of the ratchet 10 in the peripheral direction, even if the riding protrusion 34 is pushed outward in the radial direction by the rotating cam 40, the riding protrusion 34 is not pushed out to a position riding on the region 13A, so that the movement of the main pole P1 meshing with the inner peripheral teeth 12A of the ratchet 10 is not blocked.

At this time, the riding protrusions 34 of the other two sub poles P2 are formed at positions on the inner side of the radial direction than the riding protrusion 34 of the main pole P1 described above, so that even if the riding protrusions 34 are arranged to respectively overlap, in the peripheral direction, the region 13B and the region 13C (other regions A3) that protrude inward in the radial direction than the region 13A described above, the riding protrusions 34 are also not pushed out to positions riding on the region 13B and region 13C at the time of being pushed outward in the radial direction by the rotating cam 40, and therefore, the movement of each sub pole P2 meshing with the inner peripheral teeth 12A of the ratchet 10 is not blocked.

Further, as shown in FIGS. 13, 17(*b*), and 18(*b*), when the riding protrusion 34 of the main pole P1 described above is arranged to overlap the region 13B (free region A2) of the intermediate cylindrical portion 13 of the ratchet 10 in the peripheral direction, the riding protrusion 34 is pushed outward in the radial direction by the rotating cam 40 to ride on the region 13B, so that the movement of the main pole P meshing with the inner peripheral teeth 12A of the ratchet 10 is stopped at the intermediate position.

However, at this time, even if the riding protrusions 34 of the other two sub poles P2 are arranged to overlap the corresponding region 13C and region 13A (other regions A3) respectively in the peripheral direction, the riding protrusions 34 are also not pushed out to the positions riding on the region 13C and region 13A at the time of being pushed outward in the radial direction by the rotating cam 40, so that the movement of each sub pole P2 toward the outer side of the radial direction is not stopped at an intermediate position.

Even with such a configuration, the movement of the sub poles P2 toward the outer side of the radial direction of the main pole P1 is stopped at the intermediate position so that the rotation of the rotating cam 40 is accordingly stopped, and the sub poles P2 are not pushed outward further in the radial direction, so as to hold together with the main pole P1 in the unlocked state in which they are prevented from being pressed against the inner peripheral teeth 12A of the ratchet 10. Each riding protrusion 34 formed on these two sub poles P2 described above has a chamfered inclined surface 34B at a corner on one end side in the peripheral direction on the outer peripheral surface portion 34A thereof.

Each of the inclined surfaces 34B described above functions as an escape portion that allows the riding protrusions 34 of the sub poles P2 to pass over in the peripheral direction while escaping to the outer side in the radial direction by an inclined guide so as not to abut against the first projection 13D and the second projection 13E in the peripheral direction, when the ratchet 10 is rotated in a direction in which the ratchet 10 is returned from the free region A2 to the lock region A1 without operating the reclining lever 5 (when the seat back 2 is lifted up to the rear side), from a state where the riding protrusion 34 of the main pole P1 described above rides on the free region A2 (region 13B) of the ratchet 10, and the riding protrusions 34 of the sub poles P2 are located on the region 13C and the region 13A respectively as shown in FIGS. 13, 17(*b*), and 18(*b*). Here, the first projection 13D and the second projection 13E described above each correspond to a "step" of the present invention.

Further, as shown in FIGS. 4 and 5, in the main body surface portion 30A of the main pole P1 described above, the play filling hole 35 that penetrates in a shape in which a hole shape is tapered from the outer side to the inner side in the radial direction is formed in an intermediate portion that is separated from the forming region of the riding protrusion 34 in the peripheral direction. As shown in FIG. 11, the play filling hole 35 described above is set such that the play filling pin 21C protruding from the inner surface of the disc main body 21 of the guide 20 is inserted into the play filling hole 35 when the main pole P1 described above is set on the guide 20. With such a setting, the play filling hole 35 does not block the movement of the main pole P1 with the play filling pin 21C being positioned in a region where a hole width on the outer side in the radial direction is wide when the main pole P1 described above is in the unlocked state before meshing with the inner peripheral teeth 12A of the ratchet 10.

However, as shown in FIG. 10, as the main pole P1 described above is pushed outward in the radial direction and meshed with the inner peripheral teeth 12A of the ratchet 10, the play filling hole 35 described above is configured such that the play filling pin 21C is pressed into a region having a narrow inner hole width in the radial direction and can be switched to a state in which the play of the main pole P1 in the peripheral direction is prevented. According to such a configuration, the main pole P1 is meshed with the inner peripheral teeth 12A of the ratchet 10 in a state where the play in the peripheral direction is prevented, and the ratchet 10 and the guide 20 are locked via the main pole P1 in a state where the play in the peripheral direction therebetween is prevented.

As shown in FIGS. 4 and 5 and FIGS. 19 and 20, each pole 30 described above is formed such that the offset surface portion 30B and the riding protrusion 34 are pushed out separately in the same axial direction in a half-blanking shape with respect to the main body surface portion 30A so as to be spaced from each other in the radial direction. At this time, the offset surface portion 30B of each pole 30 is formed such that a quality control surface Q for imparting accuracy to a molding surface obtained by the half blanking is set, not on an outer peripheral surface portion side which is pushed out in a half-blanking shape and which faces the outer side in the radial direction, but on an inner peripheral surface portion (pressed surface portion 32) side of the main body surface portion 30A that is formed by the half blanking in a manner of facing the inner side in the radial direction. According to such a configuration, each pole 30 is configured such that the pressed surface portion 32 is accurately formed.

Further, the riding protrusion 34 of each pole 30 is formed such that the quality control surface Q for imparting accuracy to the molding surface obtained by the half blanking is set on the outer peripheral surface portion 34A side that is pushed out in a half-blanking shape and that faces the outer side in the radial direction. According to such a configuration, each pole 30 is configured such that the outer peripheral surface portion 34A and the inclined surface 34B are accurately formed. As described above, each pole 30 is formed such that the offset surface portion 30B and the riding protrusion 34 are pushed out separately in the half-blanking shape with respect to the main body surface portion 30A so as to be spaced from each other in the radial direction, so that the quality control surfaces Q can be set on the front side and the back side to improve the accuracy of the molding surfaces.

Specifically, the pressed surface portion 32 of each pole 30 described above is configured such that each region separated from the forming positions of the riding protrusions 34 on both sides in the peripheral direction are pressed by corresponding pressing portions 44 of the rotating cam 40 described with reference to FIG. 4 from the inner side in the radial direction. Therefore, in reality, the pressed surface portion 32 of each pole 30 is configured such that the quality control surface Q is set in regions on both sides where the arrangement in the peripheral direction does not overlap with the riding protrusions 34, and the quality control surface Q is not set in a region where the arrangement in the peripheral direction overlaps with the riding protrusion 34. According to such a configuration, even if the offset surface portion 30B of each pole 30 and the riding protrusion 34 are arranged to overlap each other in the peripheral direction, the quality control surface Q can be appropriately set for each and molding can be performed well.

(Rotating Cam 40)

As shown in FIG. 5, the rotating cam 40 is formed by one metal plate member being cut into a substantially disc shape and subjected to half blanking in places in a plate thickness direction (the axial direction). The rotating cam 40 described above is set in a state of being accommodated in the cam accommodating groove 24B formed on the inner surface of the disc main body 21 of the guide 20 described above.

As shown in FIG. 9, the rotating cam 40 described above has a shape having substantially the same plate thickness as each pole 30 described above, and is arranged to be surrounded by the main body surface portion 30A of each pole 30 from the outer peripheral side in a manner of being sandwiched between the inner surface of the disc main body 21 of the guide 20 described above and the offset surface portion 30B of each pole 30 pushed out in a half-blanking shape in the axial direction.

As shown in FIG. 5, at the central portion (on the central axis C) of the rotating cam 40 described above, a through hole 41 is formed in which the operation pin 5A integrally connected to the reclining lever 5 described above with reference to FIG. 1 is inserted from the inner side in the axial direction and is integrally mounted in a rotational direction. The operation pin 5A described above is inserted through the through hole 41 of the rotating cam 40 described above from the inner side to the outer side in the axial direction, and is connected integrally with the reclining lever 5 described above with reference to FIG. 1 at that point. According to such a configuration, the operation pin 5A is operated to integrally rotate with the rotating cam 40 in accordance with the operation of pulling up the reclining lever 5 described above.

The operation pin 5A described above is integrally connected to the operation pin 5A inserted into the device 4 on the other side described above with reference to FIG. 1 via a connecting rod 5B. According to such a configuration, the operation pin 5A on the other side is also integrally rotated, and the rotating cam 40 of the device 4 on the same side is also integrally rotated by the operation of pulling up the reclining lever 5 described above.

Figure 6:
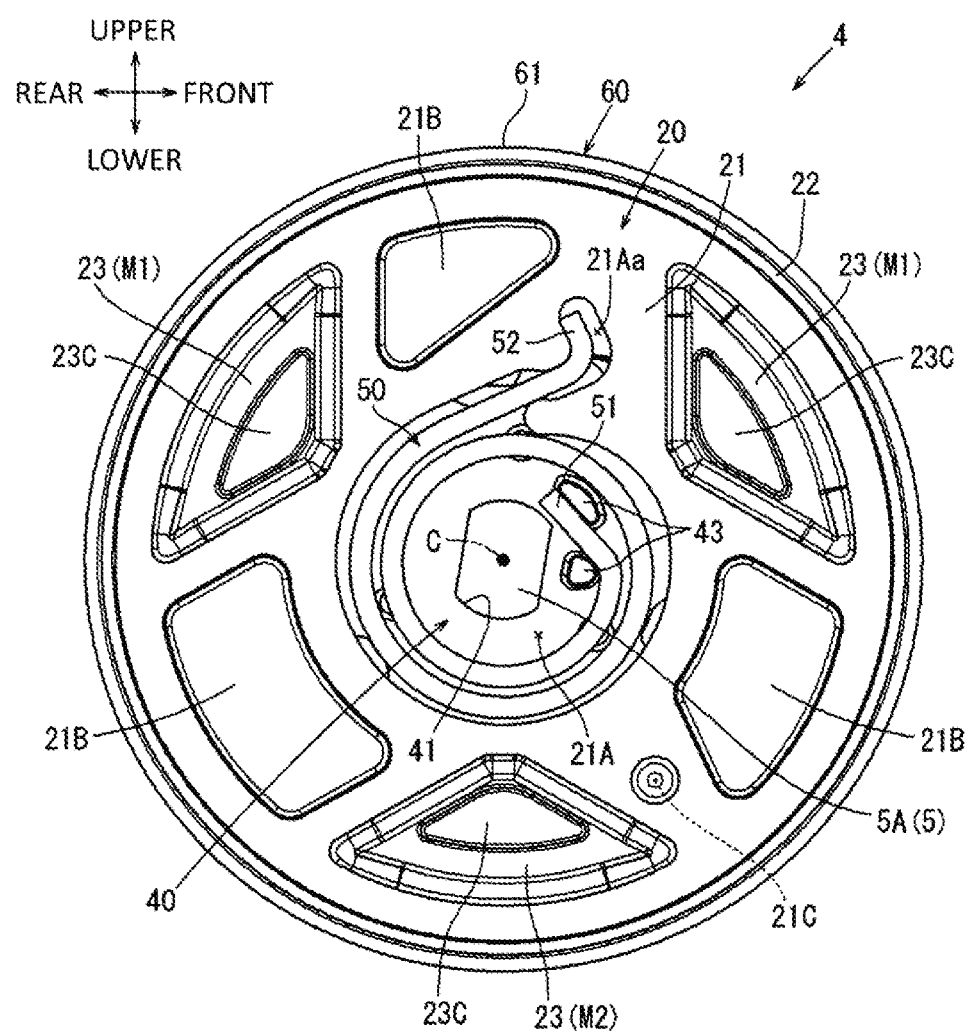
FIG. 6 is an outer side view of the vehicle seat reclining device.

As shown in FIG. 5, the rotating cam 40 described above is formed in a substantially disc shape that is slightly larger than the through hole 21A formed at the central portion (on the central axis C) of the guide 20 described above, and two hooking pins 43 are formed so as to protrude in the axial direction on an outer surface of the rotating cam 40 facing the inside of the through hole 21A of the guide 20. As shown in FIGS. 2 and 6, an inner end portion 51 of the lock spring 50 to be described later is hooked on each of the hooking pins 43 described above in a manner of being sandwiched therebetween, so as to be integrally fixed. Further, on an inner surface of the rotating cam 40 described above facing the offset surface portion 30B of each pole 30, three pull-in pins 42 which are set to be respectively inserted into corresponding pull-in holes 33 formed in each pole 30 are formed to protrude in the axial direction.

The rotating cam 40 described above is assembled to the guide 20 described above in a state of being elastically supported via the lock spring 50. That is, from the state of being set in the cam accommodating groove 24B of the guide 20 described above, the rotating cam 40 is assembled to the guide 20 in a state of being elastically supported via the lock spring 50 by setting the lock spring 50 in the through hole 21A of the guide 20, in a manner that the inner end portion 51 of the lock spring 50 is hooked between the hooking pins 43 projecting from the outer surface of the rotating cam 40 facing the inside of the through hole 21A of the guide 20, and the outer end portion 52 of the lock spring 50 is hung in the hanging hole 21Aa extending from the through hole 21A of the guide 20.

According to such an assembling, as shown in FIG. 9, the rotating cam 40 is supported in a state of being sandwiched in the axial direction between the disc main body 21 of the guide 20 described above and the offset surface portion 30B of each pole 30 pushed out in a half-blanking shape in the axial direction, and in the radial direction, is provided to be surrounded from the outer side in the radial direction by the pressed surface portion 32, which is an inner peripheral surface portion of the main body surface portion 30A of each pole 30.

The rotating cam 40 described above is always in a state of being rotationally biased in the counterclockwise direction shown in FIG. 10 with respect to the guide 20 by the spring biasing force of the lock spring 50 (see FIGS. 2 and 6) hooked between the rotating cam 40 and the guide 20. Due to the rotation in the counterclockwise direction by the biasing, the rotating cam 40 is operated by each pressing portion 44 formed to protrude at a plurality of positions in the peripheral direction on the outer peripheral surface portion of the rotating cam 40, so as to push the pressed surface portion 32 of each pole 30 from the inner side to the outer side in the radial direction.

Further, by the operation of pulling up the reclining lever 5 described above with reference to FIG. 1, the rotating cam 40 described above is rotated through the operation pin 5A in the clockwise direction shown in the figure, which is a direction opposite to the biasing direction described above as shown in FIG. 11. As a result, the rotating cam 40 is operated to pull each pole 30 inward in the radial direction by the shape in which each pull-in pin 42 inserted into the pull-in hole 33 of each pole 30 moves radially outward of each pull-in hole 33 while moving in the peripheral direction in each pull-in hole 33.

Specifically, the rotating cam 40 described above is configured such that, in a state where each pole 30 is pushed out from the inner side in the radial direction by a rotational force by the spring biasing force of the lock spring 50 and meshed with the inner peripheral teeth 12A of the ratchet 10 (locked state) as shown in FIG. 10, the inner end portion 51 of the lock spring 50 hooked on the hooking pin 43 is positioned in a region in the peripheral direction between two guide walls M1 on an upper left side and an upper right side in the figure among the three guide walls 23 formed on the guide 20.

In the above state, the rotating cam 40 receives an action of a biasing force that is eccentric toward the outer side in the radial direction in addition to a rotational biasing force in the counterclockwise direction in the figure by the spring biasing force received from the inner end portion 51 of the lock spring 50. Even so, when the poles 30 mesh with the inner peripheral teeth 12A of the ratchet 10, the rotating cam 40 is supported by the poles 30 and held in the central portion (on the central axis C) of the guide 20 in a centered state.

Figure 16:
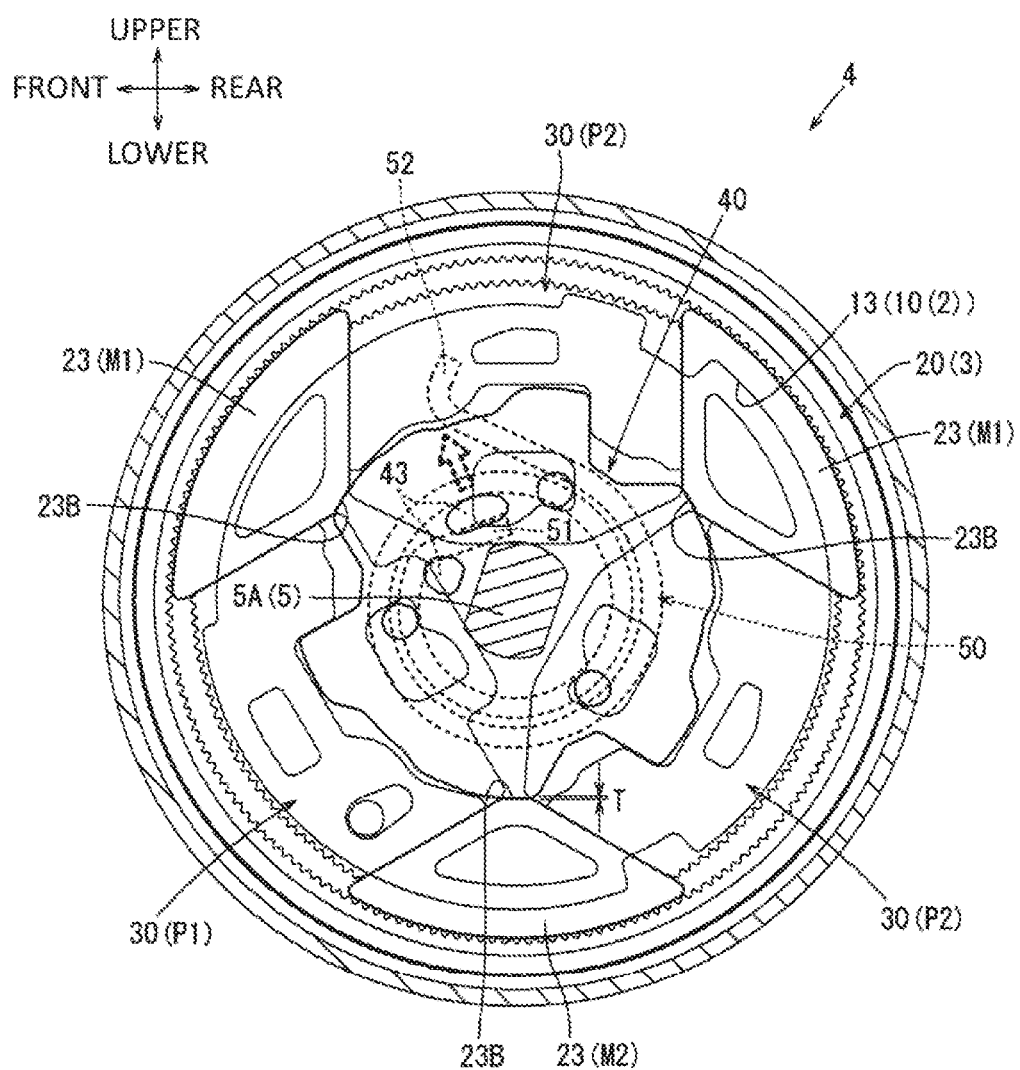
FIG. 16 is a sectional view showing a state in which a rotating cam is pressed against a guide wall by being biased.

However, in a state where the rotating cam 40 described above is rotated in the clockwise direction shown in the figure against the spring biasing force of the lock spring 50 described above, and each pole 30 does not mesh with the inner peripheral teeth 12A of the ratchet 10 as shown in FIG. 11, due to a biasing action in an eccentric direction received from the inner end portion 51 of the lock spring 50 described above, the rotating cam 40 is rotated in the clockwise direction shown in the figure in a manner of sliding on the support surfaces 23B on an inner peripheral side of two guide walls M1 while being pressed against the support surfaces 23B of these two guide walls M1 as shown in FIG. 16. At this time, unlike the other two guide walls M1, one remaining guide wall M2 is formed in such a manner that a slight gap T in the radial direction is set between the outer peripheral surface of the rotating cam 40 described above and the guide wall M2.

According to such a configuration, as shown in FIG. 16, in the two guide walls M1 against which the rotating cam 40 is pressed by the biasing action of the lock spring 50, while the rotating cam 40 is properly supported so as not to move in an axial displacement direction (eccentric direction), the rotating cam 40 properly escapes the movement when a shape is rattled in a certain direction of the one remaining guide wall M2 with these two guide walls M1 as a fulcrum, so that the rotating cam 40 can be smoothly slid and rotated in a releasing direction without eccentricity.

(Outer Peripheral Ring 60)

As shown in FIGS. 4 and 5, the outer peripheral ring 60 is formed into a substantially cylindrical shape with a hollow disc-shaped seat by punching one thin plate material into a ring shape, and drawing an outer peripheral portion of the punched hollow disc into a cylindrical shape protruding in the plate thickness direction (axial direction). As a result, the outer peripheral ring 60 has a hollow disc-shaped flange portion 62 that faces a surface in the axial direction, and a coupling portion 61 that protrudes in a substantially cylindrical shape in the axial direction along an outer peripheral edge portion of the flange portion 62.

Specifically, the outer peripheral ring 60 described above is formed by pushing out the coupling portion 61 described above from an outer peripheral portion of the flange portion 62 in a shape protruding in two steps in the axial direction, so as to be formed in a stepped cylindrical shape having an inner and outer two-step cylindrical shape in which a stepped portion 63 that is smaller in the axial direction than the coupling portion 61 and protrudes in a substantially cylindrical shape is formed on an inner peripheral side of the coupling portion 61. After the three poles 30, the rotating cam 40, and the lock spring 50 are set on the guide 20 described above and the guide 20 and the ratchet 10 are assembled, the assembled unit is set inside the cylindrical inner portion and the coupling portion 61 is welded to the guide 20, so that the outer peripheral ring 60 described above is mounted over outer peripheral portions of the ratchet 10 and the guide 20.

Figure 15:
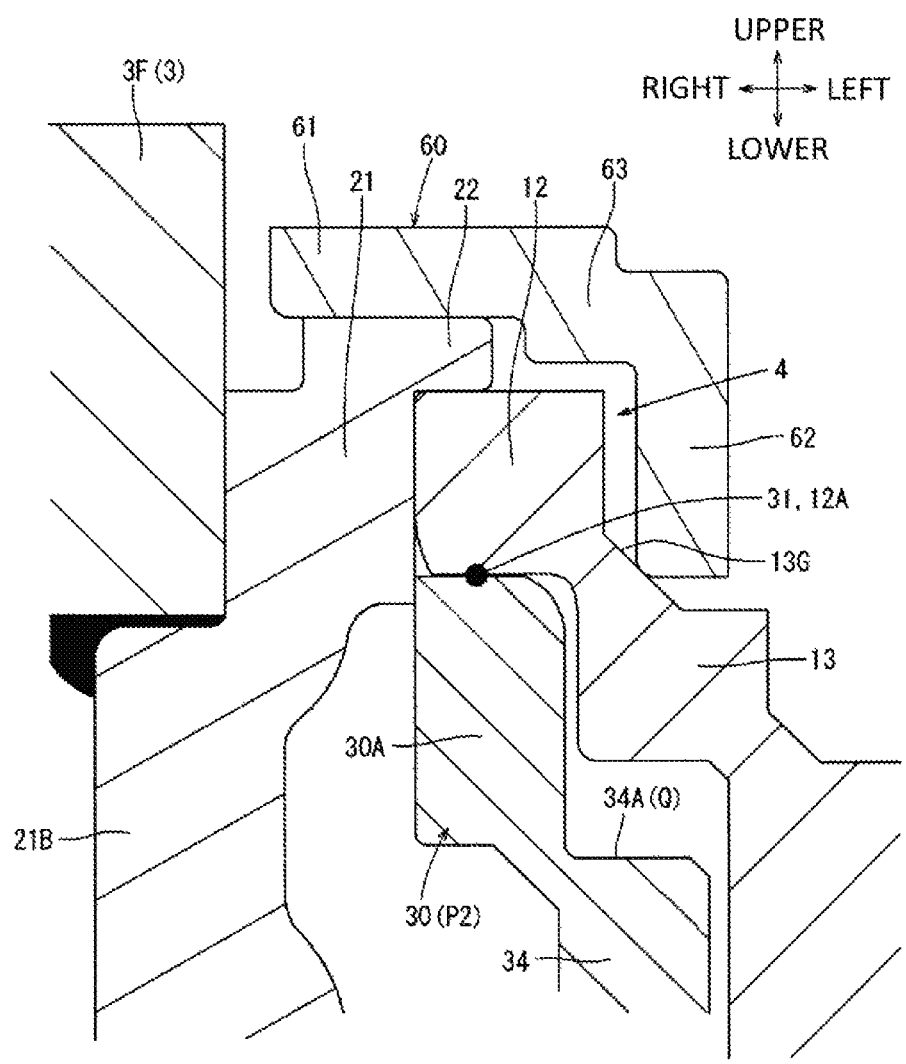
FIG. 15 is an enlarged view of an XV part in FIG. 9.

Specifically, the unit described above is set to be assembled inside the cylindrical inner portion from the ratchet 10 first, so that as shown in FIGS. 9 and 15, the outer peripheral ring 60 described above is set in such a manner that an end portion on the inner side in the radial direction of the flange portion 62 is abutted against an inclined surface 13G that is obliquely directed outward in the radial direction and formed on the outer side surface portion in the axial direction of the intermediate cylindrical portion 13 of the ratchet 10 over substantially the entire peripheral direction. With such a setting, the cylindrical portion 22 of the guide 20 is set in the cylindrical coupling portion 61 of the outer peripheral ring 60 so as to be fitted therein.

Therefore, after the above setting, the coupling portion 61 of the outer peripheral ring 60 is coupled to the cylindrical portion 22 of the guide 20 fitted therein by laser welding from the outer peripheral side, so that the outer peripheral ring 60 is mounted over the outer peripheral portions of the ratchet 10 and the guide 20. The inclined surface 13G formed on the outer side surface portion of the intermediate cylindrical portion 13 of the ratchet 10 described above is formed over the entire area of the ratchet 10 in the peripheral direction so as to draw a prefixed cone shape around the central portion (on the central axis C) of the ratchet 10.

According to such an assembling, the outer peripheral ring 60 is integrally coupled to the guide 20 described above, so that the ratchet 10 is held with respect to the guide 20 with the play being filled in the axial direction and the radial direction by the flange portion 62. Specifically, the outer peripheral ring 60 described above is set in a state where the flange portion 62 thereof is abutted against the inclined surface 13G of the ratchet 10 in the axial direction, and the coupling portion 61 is welded and assembled to the cylindrical portion 22 of the guide 20 that is assembled to the ratchet 10 and positioned in the axial direction. As a result, the outer peripheral ring 60 is in a state in which the ratchet 10 is loosened in the axial direction between the flange portion 62 and the disc main body 21 of the guide 20, and the ratchet 10 is supported with respect to the guide 20 such that the ratchet 10 can be smoothly rotationally moved when unlocked without rattling in the axial direction and the radial direction.

(Summary)

As described above, according to the device 4, the offset surface portion 30B (operation surface portion) and the riding protrusion 34 (protrusion) of the pole are formed at positions separated from each other so as to protrude from the main body surface portion 30A in a half-blanking shape, so that the processing accuracy of each of the offset surface portion 30B and the riding protrusion 34 can be set independently of each other. For example, at least a part of a surface of the riding protrusion 34 that interferes with the free region A2 (predetermined portion) of the ratchet 10 can be set as a quality control surface, and further, at least a part of the pressed surface portion 32 that receives a force directed outward in the radial direction from the rotating cam 40 can be set as a quality control surface.

Further, when the riding protrusion 34 comes into contact with the free region A2 of the ratchet 10 as the ratchet 10 rotates, the riding protrusion 34 moves so as to escape from the free region A2 while sliding the inclined surface 34B with respect to the free region A2. Therefore, the rotation of the ratchet 10 is not excessively obstructed by the riding protrusion 34, and the rotation of the ratchet 10 is facilitated. Further, the processing accuracy of the inclined surface 34B is appropriately increased, so that the effects described above can be more appropriately exhibited.

Other Embodiments

Modes for carrying out the present invention has been described with one embodiment, but the present invention can be carried out in various modes other than the above embodiment. For example, the vehicle seat reclining device of the present invention can be applied to not only a seat other than a right seat of an automobile, but also to a seats for vehicles other than automobiles such as trains, and seats provided for various vehicles such as aircraft and ships. Further, the vehicle seat reclining device described above is configured such that a seat back is connected to a seat cushion in a state where a backrest angle can be adjusted, and may also be configured such that the seat back is connected to a base such as a bracket fixed to the vehicle body side in a state where the backrest angle can be adjusted.

Further, the vehicle seat reclining device may be configured such that the ratchet is coupled to a member such as a seat cushion that is fixed to the vehicle body side, and the guide is coupled to the seat back. Further, the plurality of poles forming the lock mechanism of the vehicle seat reclining device may be provided by arranging two or four or more in the peripheral direction. The arrangement of each pole in the peripheral direction is not limited to being evenly arranged, but may be arranged to be offset.

Further, the cam that operates to push each pole outward in the radial direction may be of a type that pushes each pole outward in the radial direction by rotation, or may be of a type that slides each pole in the radial direction so as to push out each pole in a radial direction intersecting the sliding direction (see JP-A-2015-227071). The operation of pulling back each pole inward in the radial direction may be performed by a member separate from the cam, such as a release plate (see the same publication).

Here, characteristics of the embodiment of the vehicle seat reclining device 4 according to the present invention described above will be briefly summarized in the following [1] and [2].

[1]
A vehicle seat reclining device (4) including:
a disc-shaped ratchet (10) and a disc-shaped guide (20), the ratchet (10) and the guide (20) being coaxially assembled in a relatively rotatable manner;
a lock mechanism provided between the ratchet (10) and the guide (20), and capable of restricting relative rotation between the ratchet (10) and the guide (20); and
a retaining ring retaining an assembled state of the ratchet (10) and the guide (20),
in which the lock mechanism includes: a pole (30) supported by the guide (20) movably in a radial direction, the pole (30) meshing with the ratchet (10) when moving outward in the radial direction so as to restrict the relative rotation between the ratchet (10) and the guide (20); and a cam (40) for moving the pole (30) outward or inward in the radial direction,
in which the pole (30) has: a main body surface portion (30A) having outer peripheral teeth (31) configured to mesh with the ratchet (10); a pressed surface portion (32) configured to receive a force directed outward in the radial direction from the cam (40); an operation surface portion (30B) configured to receive a force directed inward in the radial direction from the cam (40); and a protrusion (34) that interferes with a predetermined portion (A2) of the ratchet (10) so as to prevent the outer peripheral teeth (31) from meshing with the ratchet (10) when the ratchet (10) is in a specific rotation position with respect to the guide (20),
in which the operation surface portion (30B) and the protrusion (34) are arranged at positions separated away from each other in the radial direction, and have a shape protruding from the main body surface portion (30A) to one side in an axial direction in a half-blanking shape, and
in which the pressed surface portion (32) is provided on an end surface of the main body surface portion (30A), the end surface of the main body surface portion (30A) being formed on the other side in the axial direction of the operation surface portion (30B) in accordance with the half-blanking shaped protrusion of the operation surface portion (30B).

[2]
The vehicle seat reclining device (4) according to [1], in which the protrusion (34) has an inclined surface that comes into contact with the predetermined portion (A2) in a peripheral direction when the ratchet (10) rotates toward the specific rotation position.

This application is based on Japanese Patent Application No. 2018-031933 filed on Feb. 26, 2018, the contents of which are incorporated herein by reference.

INDUSTRIAL APPLICABILITY

According to the vehicle seat reclining device of the present invention, it is possible to improve the processing accuracy on both front and back surfaces of a pole. The present invention having this effect is useful for a seat of an automobile or the like, for example.

REFERENCE SIGNS LIST 1 seat
2 seat back
2F side frame
2Fa fitting hole
2Fb passage hole
3 seat cushion
3F reclining plate
3Fa fitting hole
3Fb passage hole
4 seat reclining device (vehicle seat reclining device)
5 reclining lever
5A operation pin
5B connecting rod
6 return spring
10 ratchet
11 disc main body
11A through hole
11B expansion surface portion
12 cylindrical portion
12A inner peripheral teeth
13 intermediate cylindrical portion
13A region
13B region
13C region
13D first projection (step)
13E second projection (step)
13F escape recess
13G inclined surface
A1 lock region
A2 free region (predetermined portion)
A3 other region
A4 coupling region
14 dowel
W welding portion
20 guide
21 disc main body
21A through hole
21Aa hanging hole
21B dowel
21C play filling pin
22 cylindrical portion
23 guide wall
23A restriction surface
23B support surface
23C bead portion
M1 guide wall
M2 guide wall
T gap
24A pole accommodating groove
24B cam accommodating groove
30 pole
30A main body surface portion
30B offset surface portion (operation surface portion)
31 outer peripheral teeth
32 pressed surface portion
33 pull-in hole
34 riding protrusion (protrusion)
34A outer peripheral surface portion
34B inclined surface
35 play filling hole
P1 main pole
P2 sub pole
Q quality control surface
40 rotating cam (cam)
41 through hole
42 pull-in pin
43 hooking pin
44 pressing portion
50 lock spring
51 inner end portion
52 outer end portion
60 outer peripheral ring (retaining ring)
61 coupling portion
62 flange portion
63 stepped portion
C central axis

The invention claimed is:

1. A vehicle seat reclining device comprising:

a disc-shaped ratchet and a disc-shaped guide, the ratchet and the guide being coaxially assembled in a relatively rotatable manner;

a lock mechanism provided between the ratchet and the guide, and capable of restricting relative rotation between the ratchet and the guide; and a retaining ring retaining an assembled state of the ratchet and the guide, wherein the lock mechanism includes: three poles supported by the guide movably in a radial direction, the pole meshing with the ratchet when moving outward in the radial direction so as to restrict the relative rotation between the ratchet and the guide; and a cam for moving the pole outward or inward in the radial direction, wherein each pole has: a main body surface portion having outer peripheral teeth configured to mesh with the ratchet; a pressed surface portion configured to receive a force directed outward in the radial direction from the cam; an operation surface portion configured to receive a force directed inward in the radial direction from the cam; and a protrusion that interferes with a predetermined portion of the ratchet so as to prevent the outer peripheral teeth from meshing with the ratchet when the ratchet is in a specific rotation position with respect to the guide, wherein the operation surface portion and the protrusion are arranged at positions separated away from each other in the radial direction, and have a shape protruding from the main body surface portion to one side in an axial direction in a half-blanking shape, and wherein the pressed surface portion is provided on an end surface of the main body surface portion, the end surface of the main body surface portion being formed on the other side in the axial direction of the operation surface portion in accordance with the half-blanking shaped protrusion of the operation surface portion.

2. The vehicle seat reclining device according to claim 1, wherein the three poles include one main pole and two sub poles, and wherein the protrusion of each sub pole has an inclined surface that comes into contact with the predetermined portion in a peripheral direction when the ratchet rotates toward the specific rotation position.

3. The vehicle seat reclining device according to claim 1, wherein the three poles include one main pole and two sub poles, and wherein an outer shape of the protrusion of the main pole in the radial direction is different from an outer shape of the protrusion of each sub pole.

4. The vehicle seat reclining device according to claim 2, wherein, after the inclined surface comes into contact with the predetermined portion, the inclined surface allows the protrusion to move in the radial direction while keeping rotation of the ratchet in the peripheral direction.

5. The vehicle seat reclining device according to claim 2, wherein the protrusion of each sub pole has an outer peripheral surface portion in the radial direction, and wherein the inclined surface is inclined at an angle of 45 degrees or less with respect to the outer peripheral surface portion.

6. The vehicle seat reclining device according to claim 2, wherein the inclined surface is formed at a corner on one end side in the peripheral direction.

7. The vehicle seat reclining device according to claim 2, wherein the inclined surface is a chamfered inclined surface.

* * * * *